United States Patent
Brewster et al.

(10) Patent No.: US 11,926,433 B2
(45) Date of Patent: Mar. 12, 2024

(54) MECHANICAL TIME DELAY SECURITY LATCHES AND METHODS

(71) Applicants: Airbus Americas, Inc., Mobile, AL (US); Airbus Operations GmbH, Hamburg (DE)

(72) Inventors: John A. Brewster, Mobile, AL (US); Thomas Freiwald, Hamburg (DE); Christian Holst, Hamburg (DE)

(73) Assignees: Airbus Americas, Inc., Mobile, AL (US); Airbus Operations GmbH, Hamburg (DE)

( * ) Notice: Subject to any disclaimer, the term of this patent is extended or adjusted under 35 U.S.C. 154(b) by 220 days.

(21) Appl. No.: 17/390,392

(22) Filed: Jul. 30, 2021

(65) Prior Publication Data

US 2023/0036826 A1    Feb. 2, 2023

(51) Int. Cl.
*B64D 45/00* (2006.01)
*B64C 1/14* (2006.01)
*E05B 51/02* (2006.01)

(52) U.S. Cl.
CPC ........ *B64D 45/0028* (2019.08); *B64C 1/1469* (2013.01); *E05B 51/02* (2013.01); *E05B 2051/026* (2013.01)

(58) Field of Classification Search
CPC ... B64D 45/0028; B64C 1/1469; E05B 51/02; E05B 2051/026; E05B 2043/002; E05B 2043/007; E05B 17/0029; E05B 53/001; E05B 65/1086; E05B 1/02; E05C 1/004; Y10T 292/1028; Y10T 292/0969; Y10T 292/0995; Y10T 292/15
See application file for complete search history.

(56) References Cited

U.S. PATENT DOCUMENTS

| 266,601 A | 10/1882 | Blayney |
| 2,066,393 A | 1/1937 | Dials |
| 4,135,273 A | 1/1979 | Stannard |

(Continued)

FOREIGN PATENT DOCUMENTS

| DE | 10 2019 117055 A1 | 12/2020 |
| EP | 3 670 328 A1 | 6/2020 |

OTHER PUBLICATIONS

International Search Report and Written Opinion for Application No. PCT/US2022/038838 dated Oct. 17, 2022.

*Primary Examiner* — Medhat Badawi
*Assistant Examiner* — Vicente Rodriguez
(74) *Attorney, Agent, or Firm* — KDW Firm PLLC

(57) ABSTRACT

A time-delay latch for securing a structure in a specified position includes a housing, a fluid chamber contained within the housing for holding fluid, a pin that extends through the fluid chamber and is axially movable within and through the fluid chamber, and a release frame movably secured within the housing. When the pin is in a latched position, the release frame engages with the pin to prevent axial movement of the pin. When the pin is in an unlatched position, the release frame disengages from the pin to allow axial movement of the pin. The axial movement of the pin between the latched position and the unlatched position requires a prescribed duration of time to elapse. During operation, the axial movement of the pin between the unlatched position and the latched position can occur faster than the prescribed duration of time.

21 Claims, 19 Drawing Sheets

(56) References Cited

U.S. PATENT DOCUMENTS

| | | | |
|---|---|---|---|
| 4,344,647 A * | 8/1982 | Van Der Linden | ............................ E05B 65/1046 292/201 |
| 5,272,787 A * | 12/1993 | Salena | ..................... E05F 3/104 16/56 |
| 5,586,793 A | 12/1996 | Davenport | |
| 5,618,066 A | 4/1997 | Fu-Hsiang | |
| 5,746,455 A | 5/1998 | Takimoto | |
| 6,229,223 B1 | 5/2001 | Watanabe | |
| 9,033,376 B2 * | 5/2015 | Bzorgi | ..................... E05B 51/02 292/201 |
| 10,934,749 B2 | 3/2021 | Alexander | |
| 2003/0070255 A1 * | 4/2003 | Huang | ..................... E05F 3/104 16/60 |
| 2004/0239126 A1 * | 12/2004 | Pratt | .................. B64D 45/0028 292/227 |
| 2007/0202759 A1 * | 8/2007 | Bermal | ................. B64C 1/1415 441/42 |
| 2014/0265363 A1 * | 9/2014 | Mock | ..................... E05B 53/001 292/177 |
| 2018/0334237 A1 * | 11/2018 | King | .................. B64D 45/0026 |

\* cited by examiner

MECHANICAL TIME DELAY SECURITY LATCHES AND METHODS

TECHNICAL FIELD

The disclosure herein relates to devices and methods for controlling access to a designated area, in particular within an area adjacent to the cockpit of an aircraft. Specifically, the disclosure herein relates to time-delayed latches and methods that are purely mechanical and operable without using any electricity.

BACKGROUND

The ability of the flight crew of an aircraft to ensure that access to the cockpit of an aircraft during flight is of paramount importance in seeking to safeguard the wellbeing of all occupants onboard the aircraft. While in recent years the use of so-called "hardened" doors (e.g., doors that are reinforced to resist attempts to force the door open, or to break the door down) to the cockpit has increased, the fact remains that it is oftentimes necessary for a member of the flight crew to enter or exit the cockpit during flight, thereby presenting a momentary opportunity for a passenger to seek to access the cockpit while the cockpit door is temporarily open. In order to prevent such occurrences, it is anticipated that Federal Aviation Guidelines will require that aircraft be provided with so-called "secondary barriers" that prevent unauthorized access to the area of the aircraft cabin adjacent to the cockpit. Such secondary barriers are generally not "hardened," or structurally reinforced, so as to prevent any and all access to the area blocked by the secondary barrier, but are instead provided to slow down (e.g., for a prescribed period of time) any person(s) who may otherwise seek to gain access to such restricted-access areas while the hardened cockpit door is not secured. By slowing the ability of unauthorized persons towards, for example, an unsecured cockpit door, any flight crew members within the restricted-access area will immediately notice the attempted unauthorized access by any such persons and, as such, will be able to take action to secure, for example, the cockpit door against intrusion before such unauthorized persons are able to break through the secondary barrier and gain access to the restricted-access area.

At the same time, it is still necessary for flight crew members to be able to open, close, and secure the secondary barrier to allow them to perform their typical duties during flight and even to allow for flight crew members assigned to the cockpit to access the lavatories when needed. Furthermore, since the goal of the secondary barrier is to slow, not fully prevent, the movement of unauthorized person(s) beyond the secondary barrier, providing a time-delay latch, or lock, (e.g., a keyless time-delay latch, or lock) on the secondary barrier will be advantageous in terms of allowing movement of flight crew members throughout the aircraft, as necessary, without interfering significantly with flight crew operations during flight. At present, all such known time-delay latches are electromechanical devices, which require connection to a power source for operation thereof. However, the fact that it may be necessary to provide for the ability to deploy multiple secondary barriers in different locations throughout the aircraft cabin, so as to provide multiple time-limited restricted-access areas within the aircraft cabin, would require electrical and/or communications connections (e.g., wiring, cabling, and the like) at each location in the aircraft where such a time-delay latch is needed. This provides not only added cost in terms of installation during manufacturing of the aircraft, but also added complexity in terms of operations of the aircraft, controllers to operate such electromechanical time-delayed latches, and the like. As such, a need exists for a purely mechanical time-delayed latch that can be implemented without any electrical connection to any other component of the aircraft.

SUMMARY

According to an example embodiment, a time-delay latch for securing a structure in a specified position is provided, the latch comprising: a housing; a fluid chamber contained within the housing; a fluid contained within the fluid chamber; a pin that passes or extends through the fluid chamber and is configured for axial movement within and through the fluid chamber; and a release frame movably secured within the housing; wherein the release frame is configured, when the pin is in a latched position, to engage with the pin to prevent the axial movement of the pin and, when the pin is in an unlatched position, to disengage from the pin to allow the axial movement of the pin; wherein the axial movement of the pin between the latched position and the unlatched position requires a prescribed duration of time to elapse; and wherein the latch is configured such that axial movement of the pin between the unlatched position and the latched position can occur faster than the prescribed duration of time.

In some embodiments, the latch comprises a handle attached to a proximal end of the pin.

In some embodiments of the latch, the pin comprises a distal end, opposite the proximal end, which is extendable axially external to the housing to engage with the structure.

In some embodiments of the latch, the distal end of pin is configured to move from the unlatched position to the latched position, the distal end being extended further away from the housing in the latched position than in the unlatched position.

In some embodiments of the latch, an engagement portion of the release frame is configured to engage with a notch formed in the pin when the pin is in the latched position.

In some embodiments, the latch comprises a first elastic member, which is configured to exert a force against the release frame to press the engagement portion against an outer surface of the pin and into the notch when the notch is aligned with the engagement portion.

In some embodiments of the latch, the release frame is held within a slot of the housing, such that the release frame is movable only in a plane that is perpendicular to a direction of the axial movement of the pin.

In some embodiments, the latch comprises a second elastic member within the fluid chamber, which is positioned between a disc of the pin and a bottom of the fluid chamber, wherein the second elastic member is configured to exert a force against the disc, which automatically moves the pin from the latched position to the unlatched position when the engagement portion is disengaged from the notch.

In some embodiments of the latch, the fluid chamber comprises a first region and a second region, the first region being on an opposite side of the disc from the second region; the disc comprises orifices that are formed through a thickness of the disc and are configured such that the fluid can move between the first and second regions through the orifices as the pin moves between the latched and unlatched positions; a volume of the first region decreases and a volume of the second region increases while the pin moves from the latched position to the unlatched position; and the volume of the first region increases and the volume of the second region decreases while the pin moves from the unlatched position to the latched position.

In some embodiments, the latch comprises a flow restrictor configured to restrict a flow rate of the fluid from the first region into the second region through the orifices as the pin moves from the latched position into the unlatched position, relative to a flow rate of the fluid from the second region into the first region through the orifices as the pin moves from the unlatched position into the latched position, such that a force acting on the disc due to the flow of the fluid through the orifices is lower when the pin moves from the unlatched position into the latched position than when the pin moves from the latched position into the unlatched position.

According to another example embodiment, a method of controlling access to a region of an aircraft is provided, the method comprising: providing a barrier that is movable between a closed position, in which access to the region of the aircraft is restricted by the barrier, and an open position, in which access to the region of the aircraft is unrestricted by the barrier; providing a time-delay latch for the barrier, the latch comprising: a housing; a fluid chamber contained within the housing; a fluid contained within the fluid chamber; a pin that passes or extends through the fluid chamber and is axially movable within and through the fluid chamber from an unlatched position, in which the latch is configured to resist movement of the barrier, to a latched position, in which the barrier is movable without resistance from the latch, and from the latched position to the unlatched position; and a release frame movably secured within the housing; the method comprising positioning the pin in the latched position, in which the release frame engages with the pin to prevent the axial movement of the pin, relative to the fluid chamber; and moving the release frame to disengage the release frame from the pin, such that the pin automatically moves from the latched position to the unlatched position; wherein moving the pin between the latched position and the unlatched position requires a prescribed duration of time to elapse, which is more time than is needed to move the pin from the unlatched position into the latched position.

In some embodiments of the method, the latch comprises a handle attached to a proximal end of the pin and the pin comprises a distal end, opposite the proximal end and the method comprises extending the distal end of the pin away from the housing in an axial direction to engage with a locking structure of the barrier of the aircraft; wherein the distal end of the pin is external to the housing.

In some embodiments of the method, the barrier is a door and the locking structure is a brace arm with a bore hole formed and positioned such that the distal end of the pin is insertable within the bore hole when the door is in the closed position.

In some embodiments of the method, the distal pin is only aligned for insertion within the bore hole when the door is in the closed position.

In some embodiments of the method, the release frame comprises an engagement portion that is selectively engageable with a notch formed in the pin when the pin is in the latched position.

In some embodiments, the method comprises positioning a first elastic member between the housing and the release frame, such that the first elastic member exerts a force against the release frame to press the engagement portion against an outer surface of the pin and into the notch when the notch is aligned with the engagement portion.

In some embodiments of the method, the release frame is held within a slot of the housing, such that the release frame is movable only in a plane that is perpendicular to a direction of the axial movement of the pin.

In some embodiments, the method comprises providing a second elastic member within the fluid chamber, between a disc of the pin and a bottom of the fluid chamber; and exerting, via the second elastic member, a force against the disc to automatically move the pin from the latched position to the unlatched position when the engagement portion is disengaged from the notch.

In some embodiments of the method, the fluid chamber comprises a first region and a second region, the first region being on an opposite side of the disc from the second region; and the disc comprises orifices that are formed through a thickness of the disc; the method comprises moving the fluid between the first and second regions through the orifices as the pin moves between the latched and unlatched positions; wherein a volume of the first region decreases and a volume of the second region increases while the pin moves from the latched position to the unlatched position; and wherein the volume of the first region increases and the volume of the second region decreases while the pin moves from the unlatched position to the latched position.

In some embodiments, the method comprises providing a flow restrictor within the first region of the fluid chamber; and using the flow restrictor to restrict a flow rate of the fluid from the first region into the second region through the orifices as the pin moves from the latched position into the unlatched position, relative to a flow rate of the fluid from the second region into the first region through the orifices as the pin moves from the unlatched position into the latched position, such that a force acting on the disc due to the flow of the fluid through the orifices is lower when the pin moves from the unlatched position into the latched position than when the pin moves from the latched position into the unlatched position.

According to another example embodiment, an aircraft is provided, the aircraft comprising a region of the aircraft to which access must be temporarily restricted; a barrier that is movable between a closed position, in which access to the region of the aircraft is restricted by the barrier, and an open position, in which access to the region of the aircraft is unrestricted by the barrier; and a time-delay latch for the barrier. The latch comprises a housing; a fluid chamber contained within the housing; a fluid contained within the fluid chamber; a pin that passes or extends through the fluid chamber and is axially movable within and through the fluid chamber from an unlatched position, in which the latch is disengaged from the barrier to allow movement of the barrier, to a latched position, in which the latch is engaged with the barrier to restrict movement of the barrier, and from the latched position to the unlatched position; and a release frame movably secured within the housing; wherein the release frame is configured, when the pin is in a latched position, to engage with the pin to prevent the axial movement of the pin and, when the pin is in an unlatched position, to disengage from the pin to allow the axial movement of the pin; wherein the axial movement of the pin between the latched position and the unlatched position requires a prescribed duration of time to elapse; and wherein the latch is configured such that axial movement of the pin between the unlatched position and the latched position occurs faster than the prescribed duration of time.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically.

DETAILED DESCRIPTION

Figure 1:
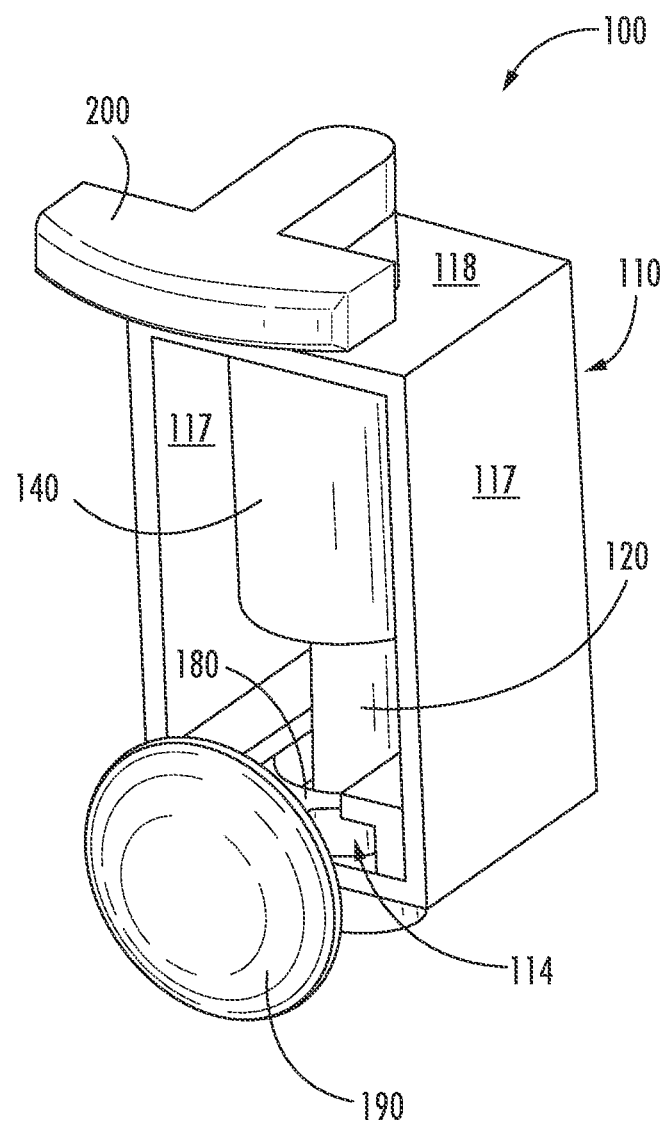
FIG. 1 is an isometric view of a first example embodiment of a mechanical time-delay latch comprising only mechanical components.
Figure 2:
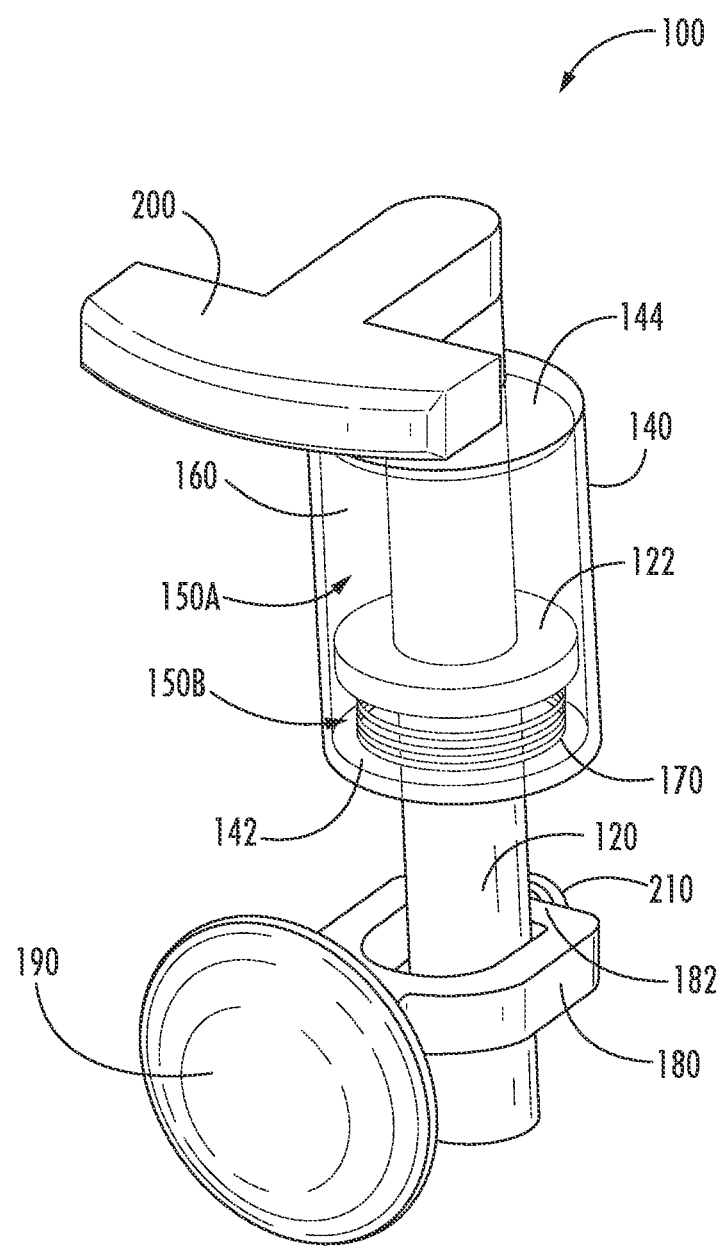
FIG. 2 is a partial isometric view of the latch of FIG. 1, from which the housing of the latch is omitted.
Figure 3:
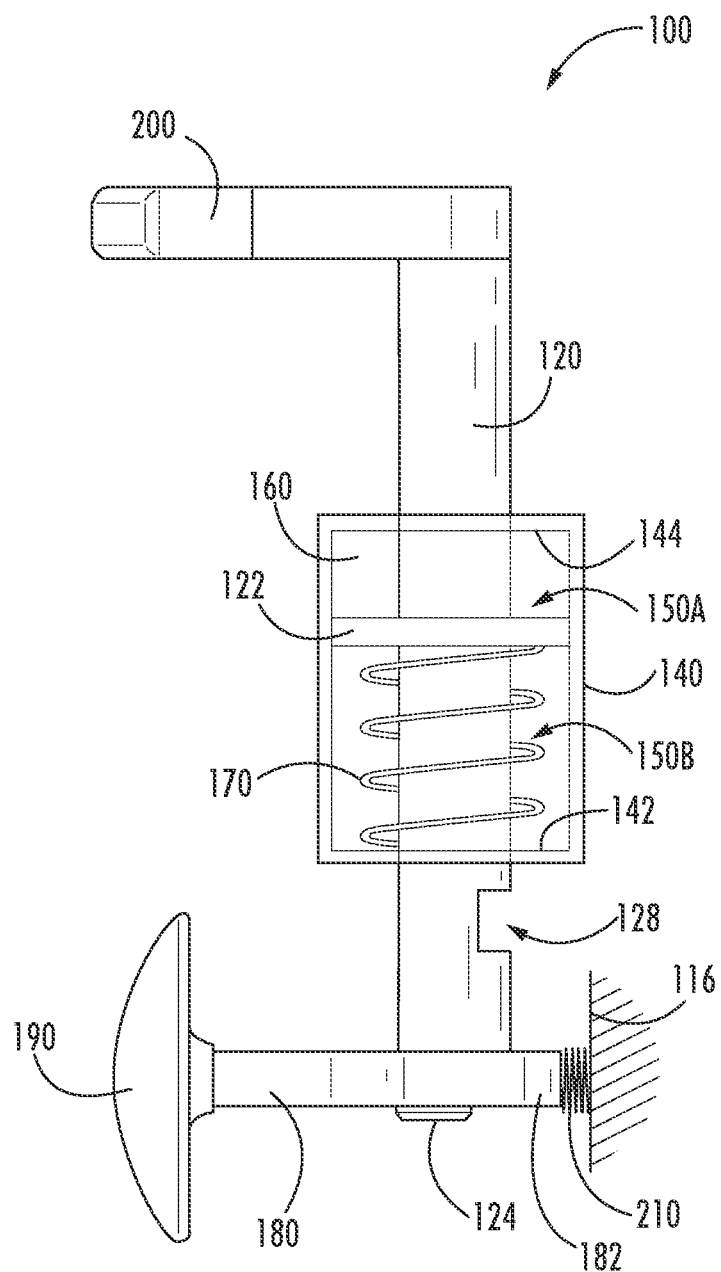
FIG. 3 is a side view of the latch of FIG. 1 in an unlatched state, from which the housing of the latch is omitted.

Time-delay latches, or locking devices, are disclosed herein that are capable of entirely mechanical operation. As used herein, "entirely mechanical" means that the latches disclosed herein can provide a designed time-delayed opening function using only mechanical devices and without using any electrical connection(s), power source(s), or anything of the sort. Thus, the latches disclosed herein are advantageously devoid of any electrical connectors or wiring. In short, the latches disclosed herein are only capable of being deployed and retracted by the actions of a human, or other living creature, such as pulling, pushing, pressing, or otherwise moving a lever (or other suitable structure) to move the components of the latch into the latched state, or configuration, and pulling, pushing, pressing, or otherwise moving a button (or other suitable structure) to move (e.g., release, after a prescribed period of time) the components of the latch into the unlatched state, or configuration. The operation of the latch is not driven and/or assisted by electric power. The operation of the latch is not driven and/or assisted through the use of any other power source, including without exception electric, hydraulic, and/or pneumatic power sources.

FIGS. 1-4 show various aspects of a first example embodiment of a time-delayed latch, generally designated 100, which is entirely operable mechanically. The latch 100 comprises a housing 110, which is used to secure the latch in any desired position and orientation on and/or in any desired structural element. An example illustration is shown in FIGS. 5-9, described later herein, in which the latch 100 is installed within a movable barrier (e.g., a secondary barrier) of an aircraft. The latch comprises a fluid chamber 140 contained within the housing 110. A pin 120 passes or extends through the fluid chamber 140. The fluid chamber 140 is filled (e.g., partially, including at least 50% or at least 75%; substantially entirely, including at least 90%, at least 95%, or at least 99%; or entirely, including 100%) with a fluid 160.

The pin 120 has a disc 122 that is rigidly attached (e.g., in a monolithic manner, or via an attachment method, such as welding, brazing, and the like) to the pin 120. The disc and/or the fluid chamber 140 have fluid passages formed therein to allow a prescribed flow of the fluid 160 through the fluid passages. The pin 140 is positioned such that at least a portion thereof, which includes the disc 122, is contained within the fluid chamber 140. Thus, the fluid chamber 140 is subdivided by the disc 122, defining a first region generally designated 150A on one side of the disc 122 and a second region generally designated 150B on the opposite side of the disc 122. The volume of the first and second regions 150A, 150B changes based on the position of the disc 122 within the fluid chamber 140. Thus, when the latch 100 is in the latched state, shown in FIG. 4, the first region 150A has a volume that is greater than the volume of the second region 150B. When the latch 100 is in the unlatched state, shown in FIG. 3, the first region 150A has a volume that is less than the volume of the second region 150B. In some embodiments, the latch 100 can be designed such that the allowable range of motion of the disc 122 within the fluid chamber 140 can be restricted so that the first region 150A can always have a greater volume than the volume of the second region 150B; the reverse arrangement is also possible, in which the second region 150B can always have a greater volume than the volume of the first region 150A.

The fluid 160 is any suitable fluid having a desired viscosity, which is selectable based on the particular application and also the quantity, size, length, etc. of the fluid passages of the latch 100, such that the latch 100 is designed such that a prescribed amount of time elapses between the time when the latch 100 is triggered (e.g., released) and when the structure secured by the latch 100 can be moved freely (e.g., without interference from the latch 100). Examples of suitable fluids for use in the fluid chamber 140 can include, for example and without limitation, water, oil, and even air in some embodiments.

The fluid 160 is contained within the fluid chamber 140, which comprises an elongated outer body, a top 144, and a bottom 142, which are sealed to the elongated outer body. In the embodiment shown, the elongated outer body is generally in the shape of a cylindrical prism. It is advantageous for the disc 122 and the elongated outer body to have a same cross-sectional shape, so that fluid passage within the fluid chamber 140, around the disc 122, is minimized and/or controlled. Thus, in the example embodiment shown, the disc 122 has a generally circular profile, or cross-sectional area, when viewed along the longitudinal axis of the pin 120. The bottom 142 and the top 144 have respective holes, or passages, formed therethrough (e.g., through an entire thickness of the bottom 142 or top 144). The hole of the top 144 is advantageously aligned with (e.g., coaxial with, aligned along the longitudinal axis of the pin 120 and/or the fluid chamber 140) the hole of the bottom 142. The pin 120 is positioned to pass through the holes formed in the bottom 142 and the top 144, with the disc 122 being contained within the fluid chamber 140, between the bottom 142 and the top 144. It is advantageous for at least one of the holes of the bottom 142 and the top 144 to have a seal provided therein, such that a fluid-tight (e.g., leak-resistant, or leak-proof) seal is provided between the pin 120 and the fluid chamber 140 at the bottom 142 and/or the top 144 and, particularly advantageously when the fluid 160 is different from the ambient environment external to the fluid chamber 140, such a fluid-tight seal is provided between the pin 120 and the fluid chamber 140 at both the bottom 142 and at the top 144, preventing the fluid 160 from exiting the fluid chamber 140 at any point where the pin 120 passes or extends through the outer walls of the fluid chamber 140.

The pin 120 extends, in a first direction, beyond the top 144 of the fluid chamber 140 and is rigidly attached to a handle 200, which can have any shape that is configured for easy manipulation by, for example, a human being and, particularly, a member of a flight crew of an aircraft. The pin 120 also extends, in a second direction opposite the first direction, beyond the bottom 142 of the fluid chamber 140 and comprises a notch, generally designated 128, formed in an outer surface thereof. The notch 128 can have any suitable shape and/or dimensions, but is advantageously designed to have at least one surface that is recessed (e.g., in the inwardly circumferential direction of the pin 120) relative to the outer surface of the pin 120. It is advantageous for the notch 128 to be formed at a point along the length of the pin 120 so that no portion of the notch 128 ever passes even partially beyond the bottom 142 of the fluid chamber 140, as this would introduce a leakage path for the fluid 160 to leak out of the fluid chamber 140.

The latch 100 further comprises a release frame 180, which extends at least partially about and behind the pin 120 and is at least slidably secured within the housing 110 and positioned relative to the pin 120 such that an engagement portion 182 of the release frame 180 is configured to engage within the notch 128 of the pin 120. In the example embodiment shown, the release frame 180 is substantially movable only within a plane defined within a slot 114 of the housing 110, in which the release frame 180 is positioned. As used herein, the term "substantially movable only within" generally means an arrangement in which assembly tolerances are accounted for, which will necessarily leave negligible gaps between the edges of the slot 114 and the release frame 180 to allow the release frame 180 to move freely (e.g., without binding and with only negligible frictional resistance due to contact with the housing 110) in the movement plane defined by the slot. In the example embodiment shown, the movement plane of the release frame 180 is substantially orthogonal, or perpendicular, to the longitudinal axis of the pin 120, which defines the movement profile of the pin 120 within the latch 100. Again, the term "substantially orthogonal" means to be designed for orthogonal arrangement between the movement plane of the release frame 180 and the pin 120, but allowing for negligible misalignments (e.g., less than 5°, less than 2°, or less than 1°) between the longitudinal axis of the pin 120 and the movement plane of the release frame 120 that are necessitated by accounting for tolerance variations between components that will allow for reliable assembly of the latch 100.

The latch 100 can also have an actuator 190, that can be in the form of a button in the example embodiments shown herein and that is rigidly attached to the opposite end of the release frame 180 from the engagement portion 182. The latch 100 also has a first elastic member 210, which is the form of a helical spring in the example embodiments shown herein, that is positioned between the rear wall 116 of the housing 110 and the engagement portion 182 of the release frame 180. The first elastic member 210 is designed and positioned to apply a force against the engagement portion 182 of the release frame 180 that biases the release frame 180, within the movement plane, away from the back wall 116 (or any other surface against which the first elastic member 210 may be positioned or seated against), such that the engagement portion 182 is held against (e.g., in direct contact with) the outer surface of the pin 120 and, as the pin 120 moves vertically relative to the release frame 180, such that the engagement portion 182 is automatically moved into the notch 128 when the pin 120 moves a sufficient distance that the notch 128 is vertically aligned with the engagement portion 182 (e.g., when the notch 128 is positioned within the movement plane of the release frame 180). Because of the biasing force applied by the first elastic member 210 against the release frame 180, the engagement portion 182 will remain engaged within (e.g., in the manner of an obstruction) the notch 128 unless and/or until the release frame 180 is moved within the movement plane by a sufficient distance such that the engagement portion 182 is dislodged from the notch 120, thereby allowing the pin 120 to move vertically, generally along the direction of the longitudinal axis of the pin 120.

The actuator 190 is configured to be pushed, pulled, depressed, or otherwise moved by, for example, a human being (e.g., a member of the flight crew of the aircraft), which movement is then transmitted (e.g., directly) to the release frame 180 for movement thereof in the movement plane to dislodge (e.g., entirely) the engagement portion 182 from the notch 128. In some embodiments, it may be advantageous, for example, when the latch is installed such that the actuator 190 extends into or adjacent to a high-traffic area, for the actuator 190 to be coupled to the release frame 180 in a damped, or isolated, manner. For example, a spring or other suitable damper may be used to connect the actuator 190 to the release frame 180, such that incidental contact with the actuator 190 would not cause an unintended release of the latch 100.

Figure 4:
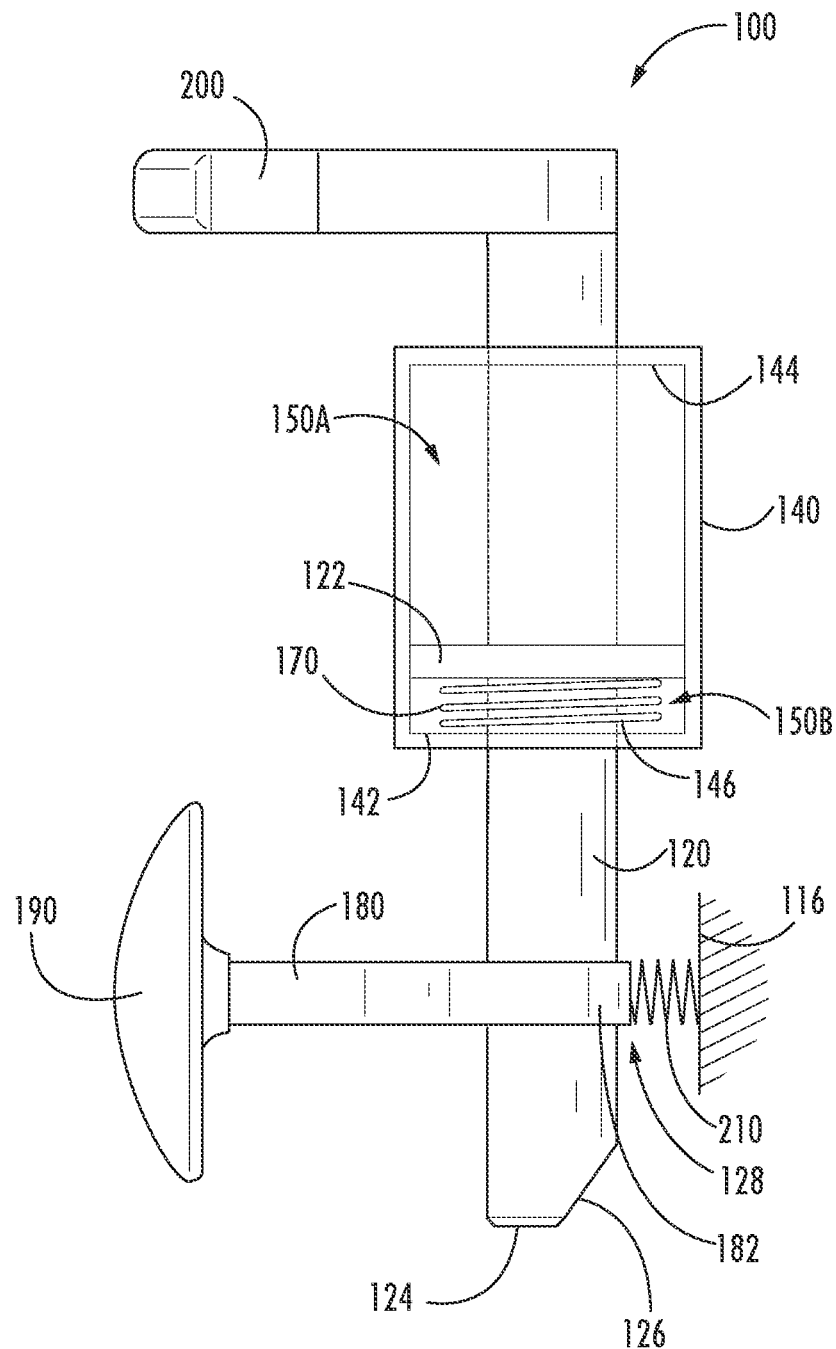
FIG. 4 is a side view of the latch of FIG. 1 in a latched state, from which the housing of the latch is omitted.

The latch 100 comprises a second elastic member 170 (e.g., a helical spring or other suitable elastically compressible member), which is positioned entirely within the second region 150B of the fluid chamber and between the disc 122 and the bottom 142 of the fluid chamber 140. The second elastic member 170 is thus configured to apply a force to the disc 122, and thereby to the pin 120, in the vertical direction (e.g., in the longitudinal direction of the pin 120). As shown in FIG. 4, when the engagement portion 182 is positioned within the notch 128, the second elastic member 170 is compressed within the fluid chamber 140 and the volume of the second region 150B is smaller than the volume of the first region 150A. When the second elastic member 170 is compressed in the manner shown in FIG. 4, the second elastic member 170 exerts an expansion force on the disc 122, such that, when the engagement portion 182 is dislodged from the notch 128, the expansion force cause the pin 120 to automatically move in the longitudinal direction, such that the length of the second elastic member 170 increases and the volume of the second region 150B increases, while the volume of the first region 150A decreases by a commensurate amount, until the components of the latch are arranged in the unlatched state, shown in FIG. 3. Similarly, the handle 200 is configured to transmit an input (e.g., by being moved by a human) received at the handle 200 directly to the pin 120, which moves the pin 120 in the vertical direction, such that the volume of the second region 150B decreases and the volume of the first region 150A increases by a commensurate amount, until the components of the latch are arranged in the latched state, shown in FIG. 4, in which the engagement portion 182, by virtue of being pressed against the outer surface of the pin 120 at all times when the pin 120 is in motion due to the force exerted by the first elastic member 210, is automatically engaged with (e.g., inserted within) the notch 128 after the pin 120 has moved a sufficient amount such that the notch 128 and the engagement portion 182 are positioned in substantially the same plane (e.g., the movement plane of the release frame 180).

The latch 100 is designed and configured such that the components thereof can be moved from the unlatched state into the latched state substantially instantaneously (e.g., within 1 second) but that movement from the latched state into the unlatched state cannot occur without a prescribed amount of time elapsing, which can be selected based on the application and setting in which the latch 100 is installed. In discussing an example embodiment, reference will be made herein to a prescribed amount of time being at least 5 seconds, however, the latch 100 may be designed to provide virtually any other amount of time while moving between the latched state and the unlatched state.

Figure 14:
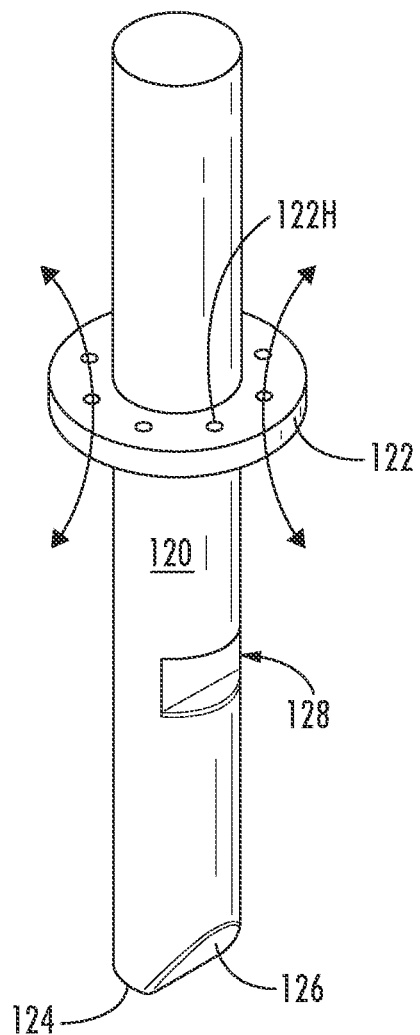
FIG. 14 is an isometric view of the pin of FIG. 13, in which fluid flow through orifices of the pin flange is schematically illustrated.

In the example embodiments disclosed herein, the properties of fluid dynamics are utilized in designing the latch 100 to provide the specified time delay between the latched and unlatched states. In the example embodiments disclosed herein, one or more (e.g., a plurality of) orifices 122H are provided in the form of holes through the entire thickness of the disc 122. The dimensions and orientations of the orifices 122H are selected based on the characteristics (e.g., viscosity and the like) of the fluid 160, such that when the pin 120 is moved vertically between the unlatched and latched states, only a negligible force is exerted on the pin due to the flow of the fluid 160 through the orifices 122H, thereby allowing the latch 100 to be set to the latched state from the unlatched state substantially instantaneously (e.g., less than 1 second). As used herein, the term "negligible force" is used to refer to a force that is at least an order of magnitude lower than the force that is generated by flow of the fluid 160 through the orifices 122H as the pin 120 is moved vertically between the latched and unlatched states. As shown in FIG. 14, the fluid 160 is configured to flow bidirectionally through the orifices 122H of the pin 120 as the pin 120 moves within the fluid chamber 140.

The pin 120 comprises a distal end 124 that, when in the latched state, extends through the bottom wall 119 of the housing 110 and engaged within a corresponding slot, hole, channel, or other similar structure formed in or attached to a structure that, when the distal end 124 is inserted therein, prevents and/or resists movement (e.g., an opening movement) of the movable structure, such as a secondary barrier of an aircraft. The distal end 124 of the pin can include an optional sloped edge 126 to allow for a sliding engagement or disengagement, depending on orientation thereof, of the pin 120 into or out of the recess of the structure being secured by the latch 100, an example embodiment of which is shown in FIGS. 5-9 and will be described further elsewhere herein.

Figure 15:
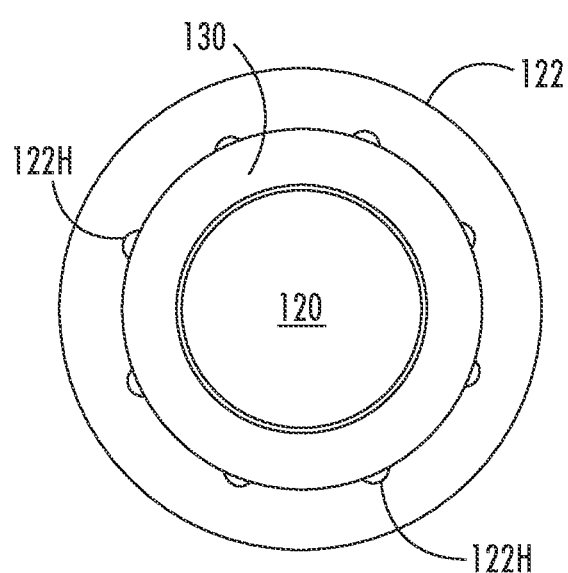
FIG. 15 is a top view of the pin of FIG. 13 with a flow restrictor arranged about the pin to provide a unidirectional flow resistance.

FIGS. 15 through 18 show various aspects of an example embodiment of a latch 100 that includes a flow restrictor 130, in the form of a generally annularly-shaped structure, that is arranged concentrically about the pin 120 within the first region 150A. The structures of the fluid chamber 140 are omitted from the illustrations of FIGS. 14 through 18 to better illustrate the features shown in these figures. As shown in FIG. 15, each of the orifices 122H has substantially the same size and shape and is formed circumferentially about the disc at a same distance, measured radially, from the longitudinal axis of the pin 120. The flow restrictor 130 has an inner radius that is substantially similar to the outer radius of the pin 120 and a constant outer radius that is between the inner edge of the orifices 122H and the outer edge of the orifices 122H, such that the flow restrictor 130 will block a portion of each of the orifices 122H when the flow restrictor 130 is positioned adjacent to (e.g., less than a thickness of the flow restrictor 130 or in direct contact with) the upper surface of the disc 122. The flow restrictor is positioned within the first region 150A because, when the pin 120 moves from the latched state into the unlatched state, the disc 122 will move towards the flow restrictor 130, such that the flow restrictor 130 will be biased against the orifices 122H and the disc 122 as the pin moves towards the unlatched position shown in FIG. 3. Friction induced by the flow of the fluid 160 through the orifices 122H will also cause a force to be exerted against the flow restrictor 130 in the direction of the surface of the disc 122 to maintain the flow restrictor 130 against the surface of the disc 122 while the pin 120 moves into the unlatched position.

When the pin 120 is moved from the unlatched position into the latched position, however, the latch 100 is configured such that the flow restrictor 130 will, at least temporarily, be spaced apart from the surface of the disc 122 on and through which the orifices 122H are formed, to allow substantially the entire diameter of each of the orifices 122H to be unobstructed for flow of the fluid 160 from the second region 150B into the first region 150A. When the longitudinal axis of the pin 120 is aligned with gravity, as in the example embodiments described herein, gravity will cause the flow restrictor 130 to gradually (e.g., at a slower rate than the disc 122) move through the fluid chamber 160 so as to rest against (e.g., directly against) the disc 122 when the pin is in the latched position, so as to restrict the flow of the fluid 160 through the orifices 122H automatically and immediately when the engagement portion 182 is dislodged from the notch 128. Thus, in some embodiments the positioning of the flow restrictor 130 onto the disc 122 is controlled only by gravity and the movement of the disc 122 itself.

Figure 17:
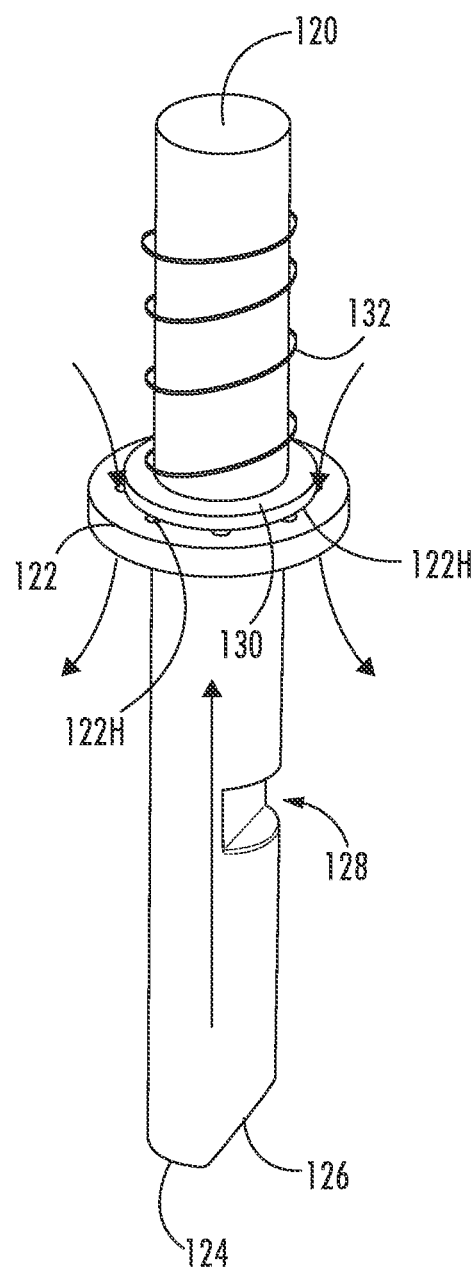
FIG. 17 is an isometric view of the pin and flow restricting device shown in FIG. 15, in which the flow restrictor is positioned adjacent to, so as to at least partially block, the orifices of the orifice plate to restrict the flow rate of the fluid through the orifices.

In some instances, it may be possible for the flow restrictor 130 to become misaligned to such a degree that it will "jam," or be unable to move into the position shown in FIG. 17, at some point along the length of the pin 120, to such a degree that the force of gravity alone on the flow restrictor 130 will be insufficient to cause the flow restrictor to move into the position shown in FIG. 17, such that the flow restrictor 130 will remain at some position along the length of the pin 120, spaced apart from the disc 122, such that the flow of the fluid 160 through the orifices 122H will be unrestricted by the flow restrictor 130 for at least a portion of travel of the pin between the latched and unlatched positions, which can then cause the amount of time that elapses between the time when the actuator 190 is pushed and when the pin 120 moves into the unlatched position to be less than the specified amount of time that is required for a specific application or installation of the latch 100.

Figure 16:
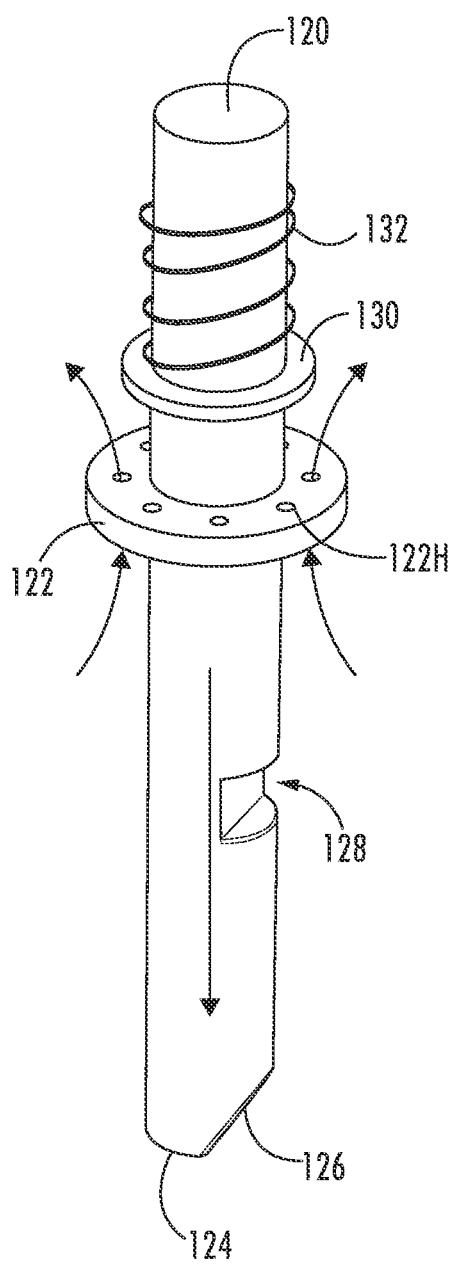
FIG. 16 is an isometric view of the pin and flow restricting device shown in FIG. 15, in which the flow restrictor is spaced axially apart from the orifices, due to fluid dynamics and movement of the orifice plate away from the flow restrictor, to allow an unrestricted flow of a fluid through the orifices.

In order to avoid such misalignments from occurring, it is envisioned that a third elastic member 132, in the form of a so-called "helper" spring, which is shown as a generally helically-shaped coil spring, can be provided between the flow restrictor 132 and the top 144 of the fluid chamber 140. Thus, as the pin 120 moves within the fluid chamber from the latched position into the unlatched position and the fluid 160 flows through the orifices 122H from the first region 150A into the second region 150B, the third elastic member is compressed. The third elastic member 132 is designed such that the force exerted on the flow restrictor 130 is less than the force exerted on the disc by the second elastic member 170. It is particularly advantageous for the third elastic member 132 to produce a force that is at least an order of magnitude less than the force produced by the second elastic member 170, even when the pin 120 is in the unlatched position shown in FIG. 3. The sole purpose of the third elastic member 132 is to apply a substantially uniform force around the circumference of the flow restrictor 130, such that the flow restrictor 130 remains substantially parallel to the disc 122, to avoid binding of the flow restrictor 130 on the pin 120. The force exerted by the third elastic member 132 is further advantageously small enough, in some embodiments, to ensure that the flow restrictor 130 remains spaced apart from the surface of the disc 122 to allow for substantially unobstructed flow of the fluid 160 through the orifices 122H from the second region 150B into the first region 150A as the pin 120 moves from the unlatched position of FIG. 3 into the latched position of FIG. 4. This is shown in FIG. 16, in which the pin 120 is shown moving vertically downward, the fluid 160 (designated by the arrows through orifices 122H) is flowing through the orifices 122H in the direction opposite the direction of motion of the pin 120, and the flow restrictor 130 is spaced apart from the surface of the disc 122, such that the orifices 122H remain substantially unobstructed. The converse is shown in FIG. 17, in which the pin 120 is shown moving vertically upward, the fluid 160 (designated by the arrows through orifices 122H) is flowing through the orifices 122H in the direction opposite the direction of motion of the pin 120, and the flow restrictor 130 is adjacent to (e.g., in direct contact with) the surface of the disc 122, such that the orifices 122H are at least partially obstructed by the positioning of the flow restrictor 130.

In some embodiments, an alternate embodiment for a flow restrictor may include a flexible membrane that has a portion thereof that is adhesively and/or mechanically attached to the disc and in which the portion that is not attached to the disc is selectively displaceable away from the surface of the disc on which the orifices are formed depending on the direction of the fluid flow through the orifices. In such an embodiment, the flow restrictor may be a generally annularly-shaped element, similar to the flow restrictor 130; one or more segments, each of which is associated with and at least partially covers (e.g., in a selective manner) one of the orifices; fingers that are formed into a generally annularly-shaped element, which extend radially and cover at least a portion of one or more of the orifices; or combinations thereof.

Figure 18:
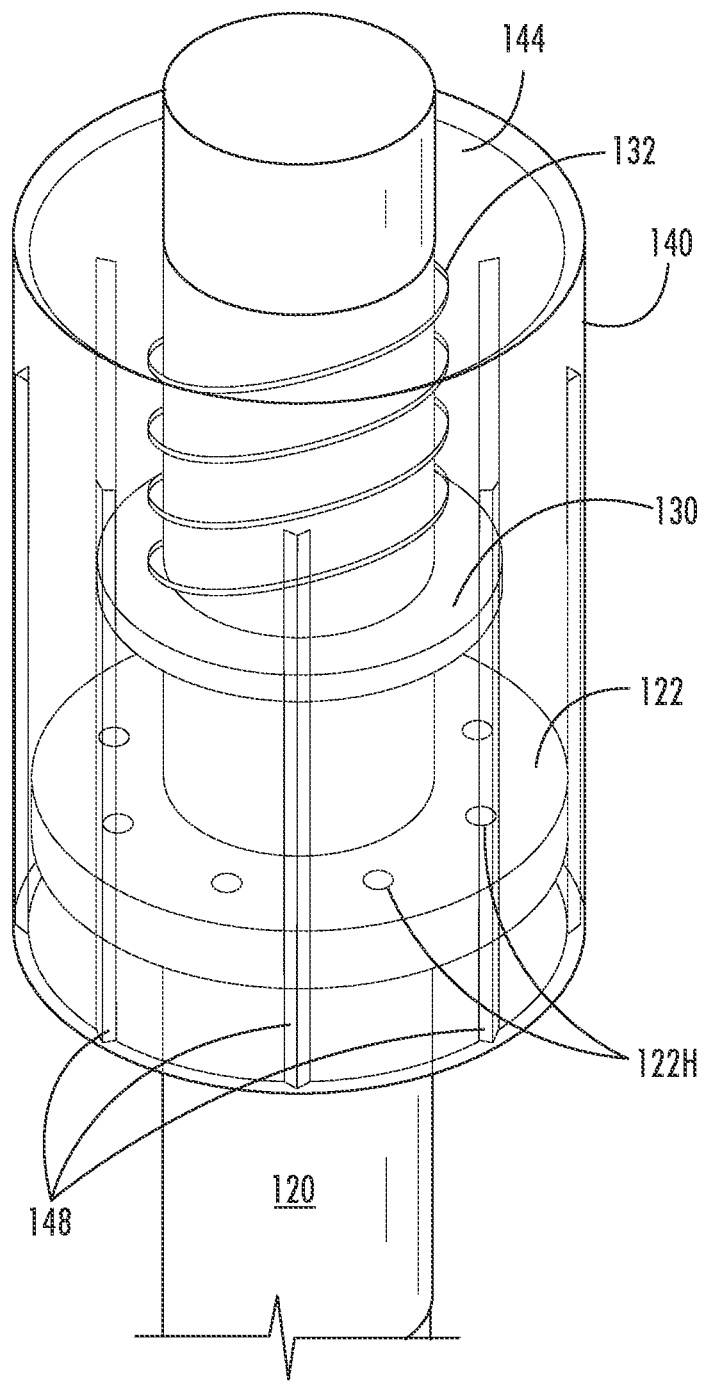
FIG. 18 is an isometric view of a further example embodiment of a fluid chamber, pin, and flow restrictor suitable for use in any of the latches disclosed herein.
Figure 19:
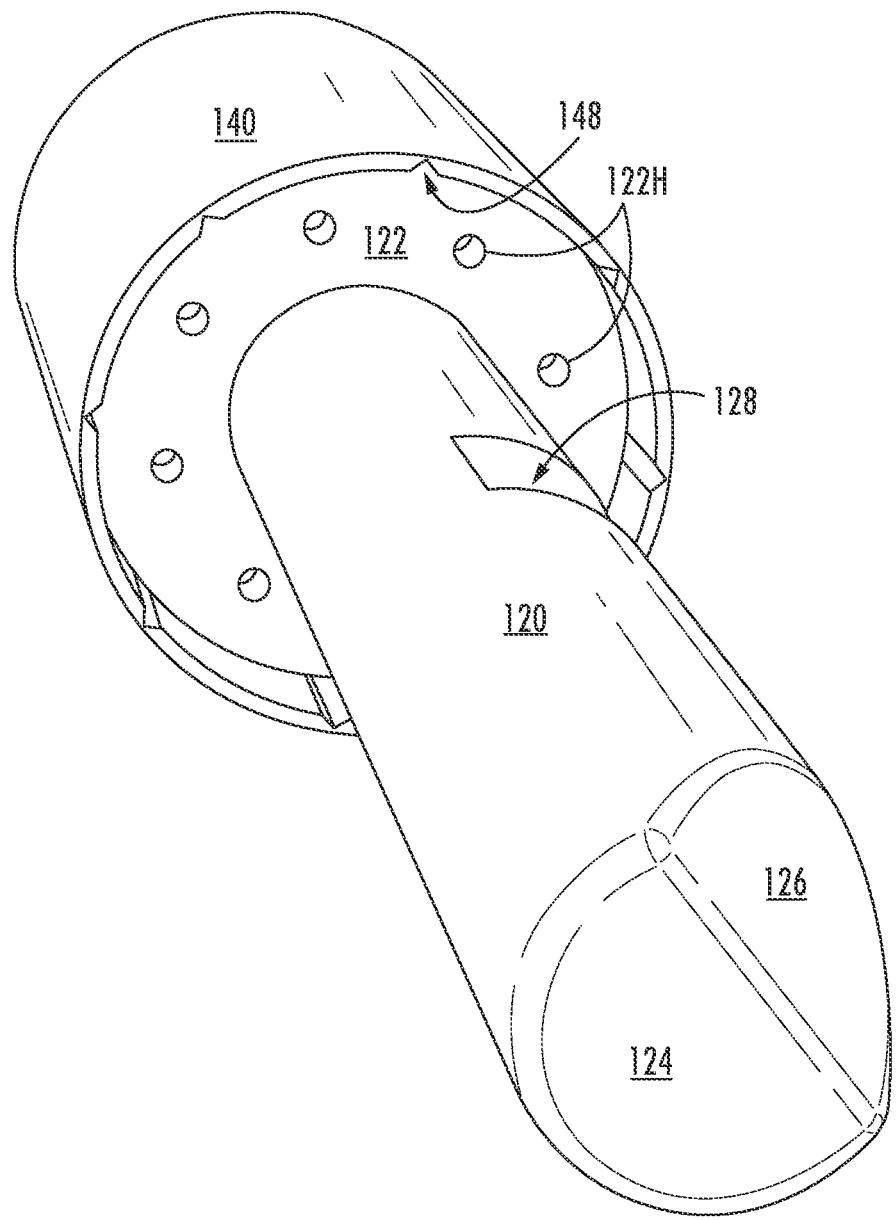
FIG. 19 is a perspective view of the fluid chamber, pin, and flow restrictor shown in FIG. 18.
Figure 20:
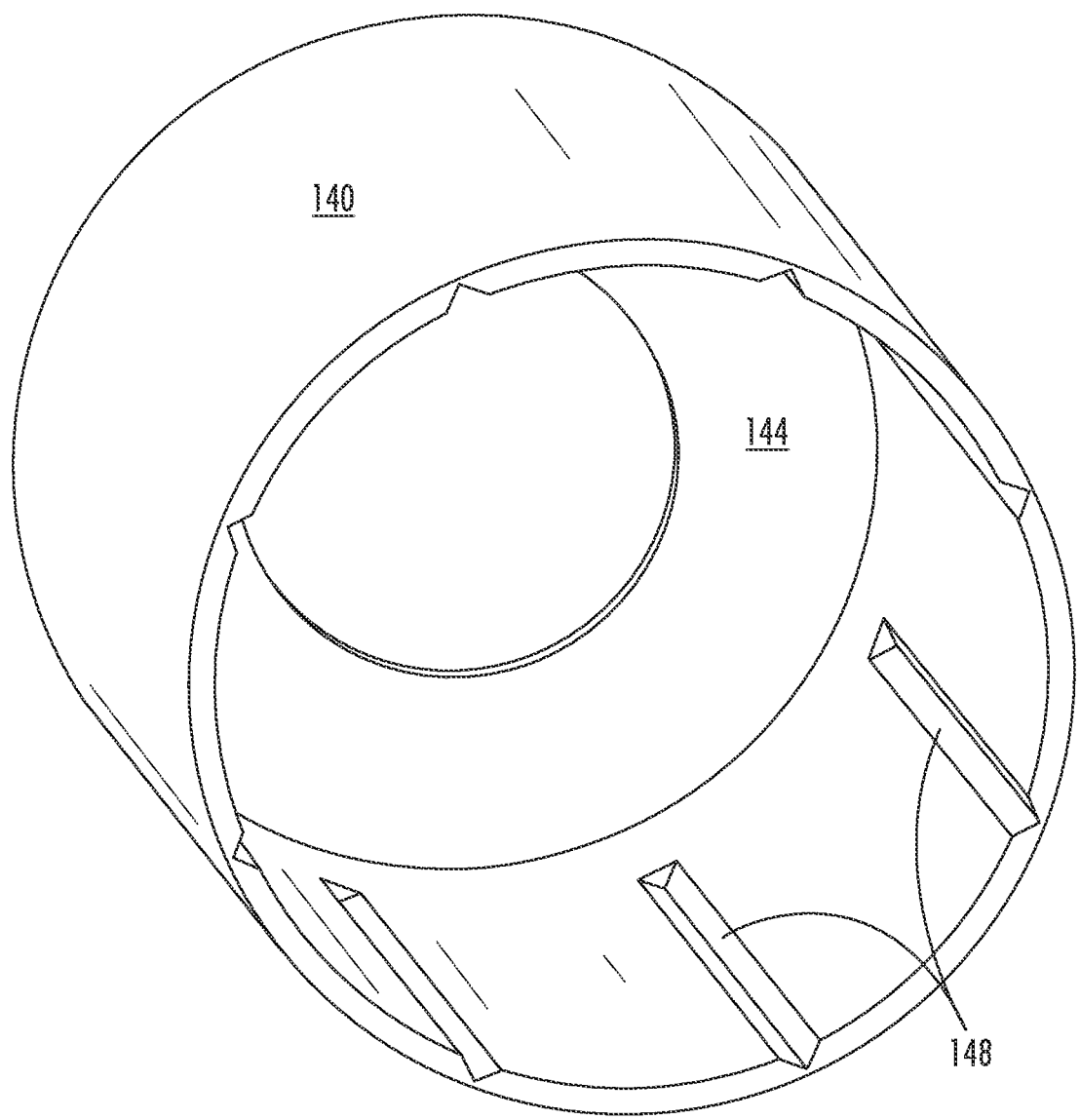
FIG. 20 is a perspective isometric view of a portion of the fluid chamber shown in FIGS. 18 and 19.

FIGS. 18 through 20 show further example embodiments of a fluid chamber 140 in which channels 148 for the fluid 160 to flow between the first and second regions 150A, 150B of the fluid chamber 140 are provided on the inner circumferential surface of the fluid chamber 140. The channels 148 extend over all or a portion (e.g., a majority) of the fluid chamber 140, in the example embodiment shown in FIGS. 18-20. The channels 148 can be used instead of, or in conjunction with, orifices 122H formed in the disc 122 and operate on the same basis of fluid dynamics as the orifices 122H, described elsewhere herein. When used in conjunction, the fluid 160 flows both through the orifices 122H and around the disc 122 when the pin 120 is moving relative to the fluid chamber 140.

Figure 21:
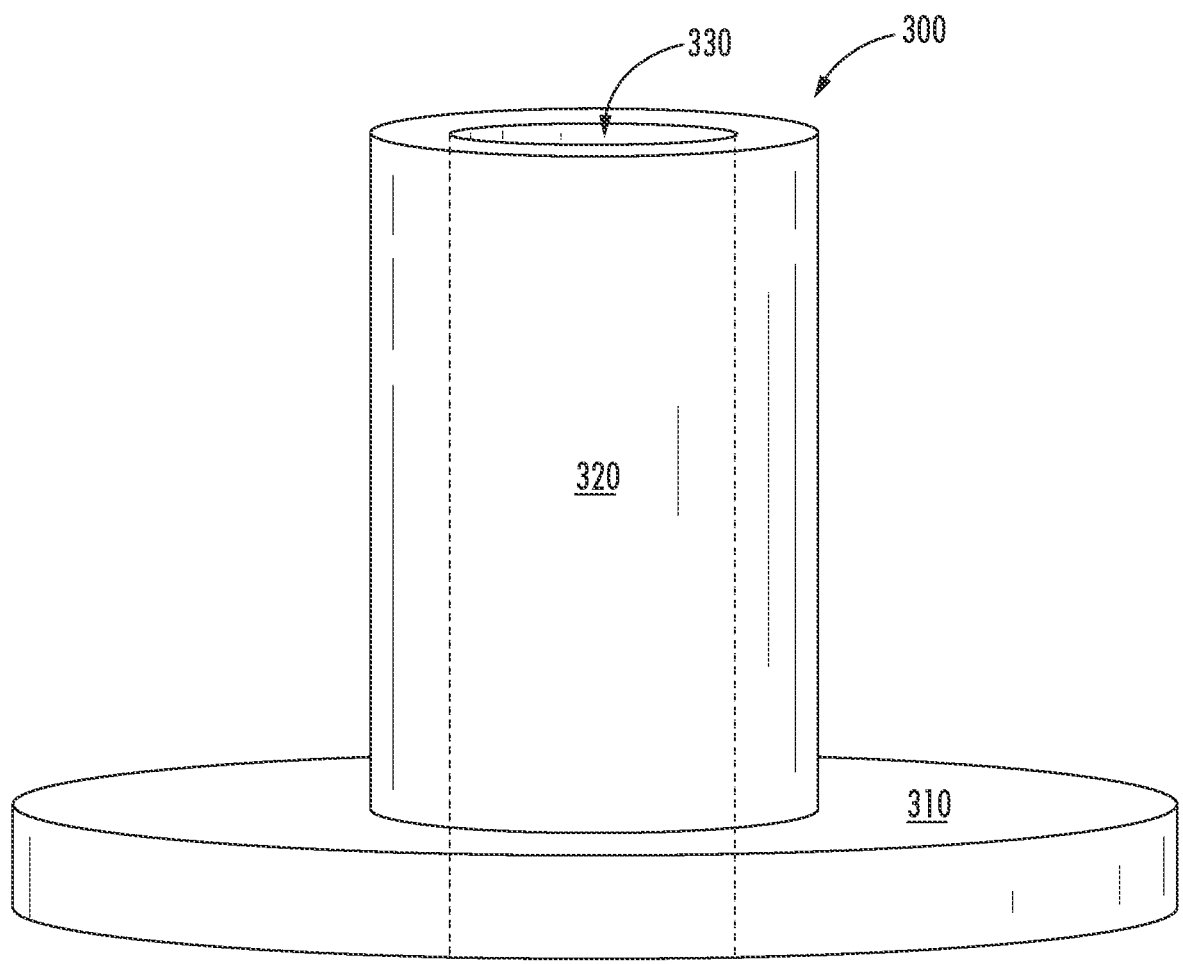
FIG. 21 is another example embodiment of a flow restrictor suitable for use in any of the example latches disclosed herein.

FIG. 21 shows an alternate embodiment of a flow restrictor, generally designated 300, which can be used substantially interchangeably in place of the flow restrictor 130 described elsewhere herein. The flow restrictor 300 has a plate 310 and a shaft 320, which are joined together and have a bore 330 formed through each. The use of the shaft 320 is advantageous because, due to the increased length and mass of the flow restrictor 300, the risk of the flow restrictor being jammed, or stuck, on the pin 120 is greatly reduced, if not entirely eliminated, compared to the flow restrictor 130. It is considered advantageous for the bore 330 to have a length that is the same as or greater than the diameter of the pin 120.

Figure 10:
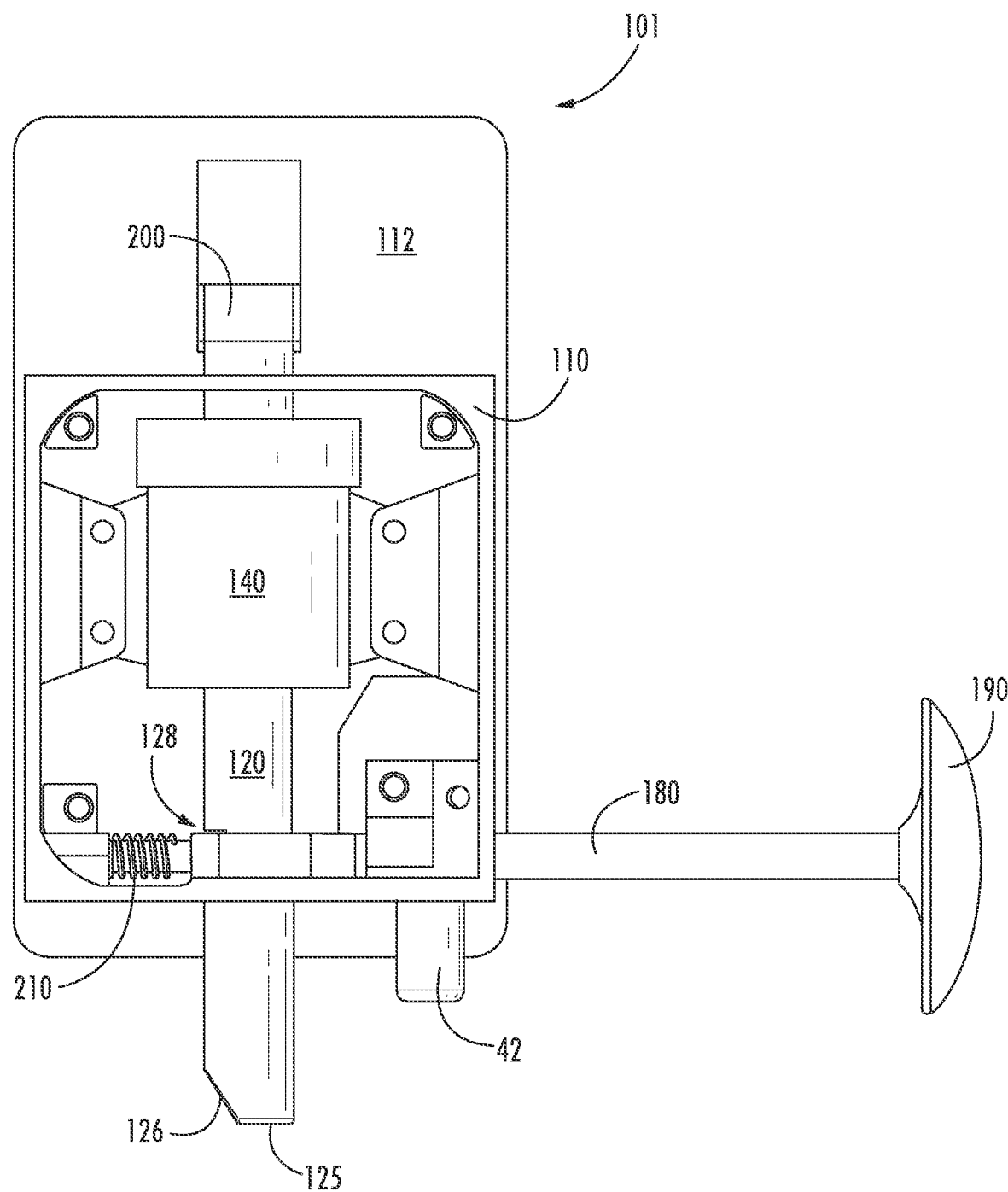
FIG. 10 is a rear view of a second example embodiment of a time-delay latch comprising only mechanical components.
Figure 11:
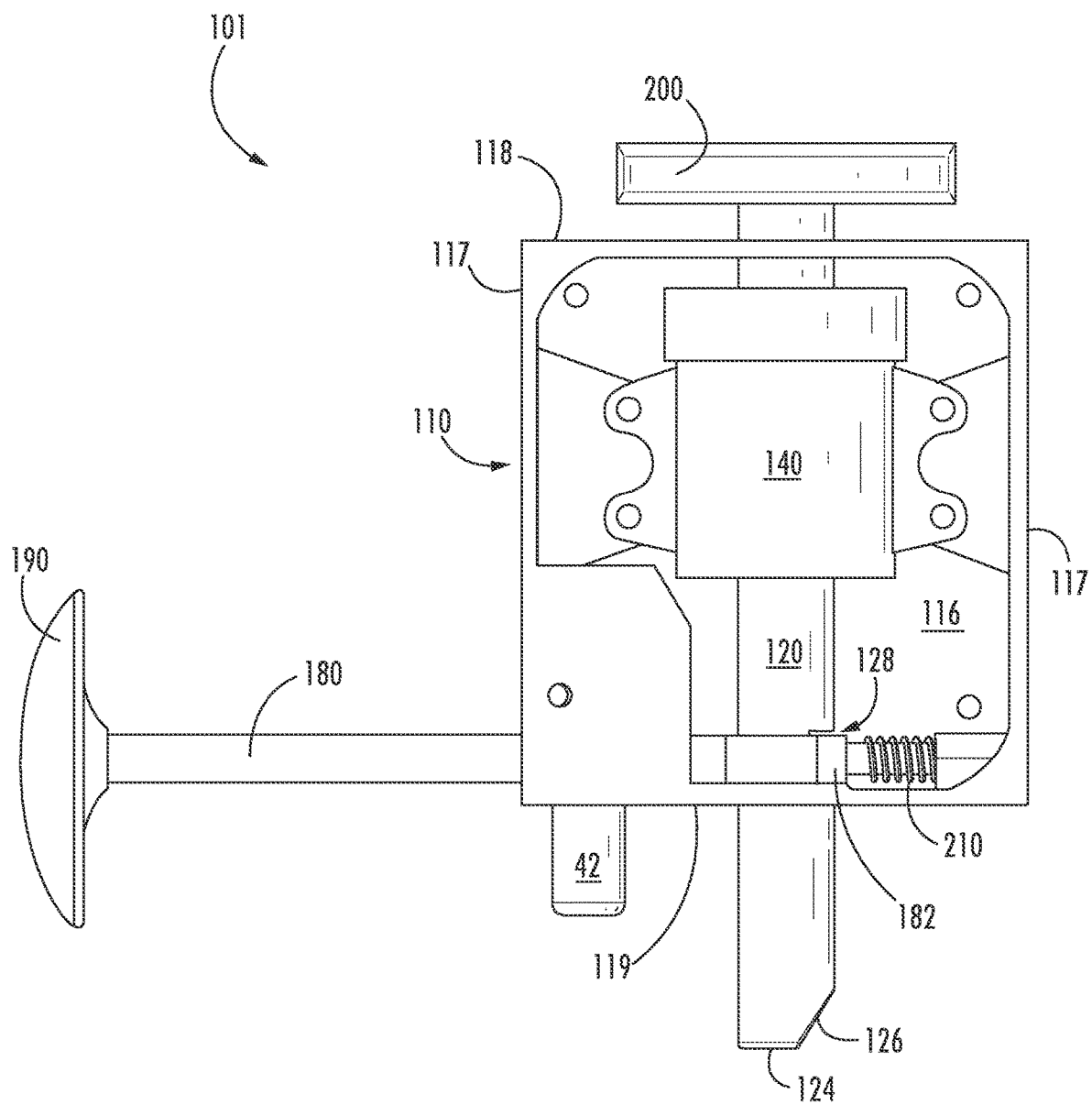
FIG. 11 is a front view of the latch of FIG. 10, with the front cover omitted to show the internal structure of the latch.
Figure 12:
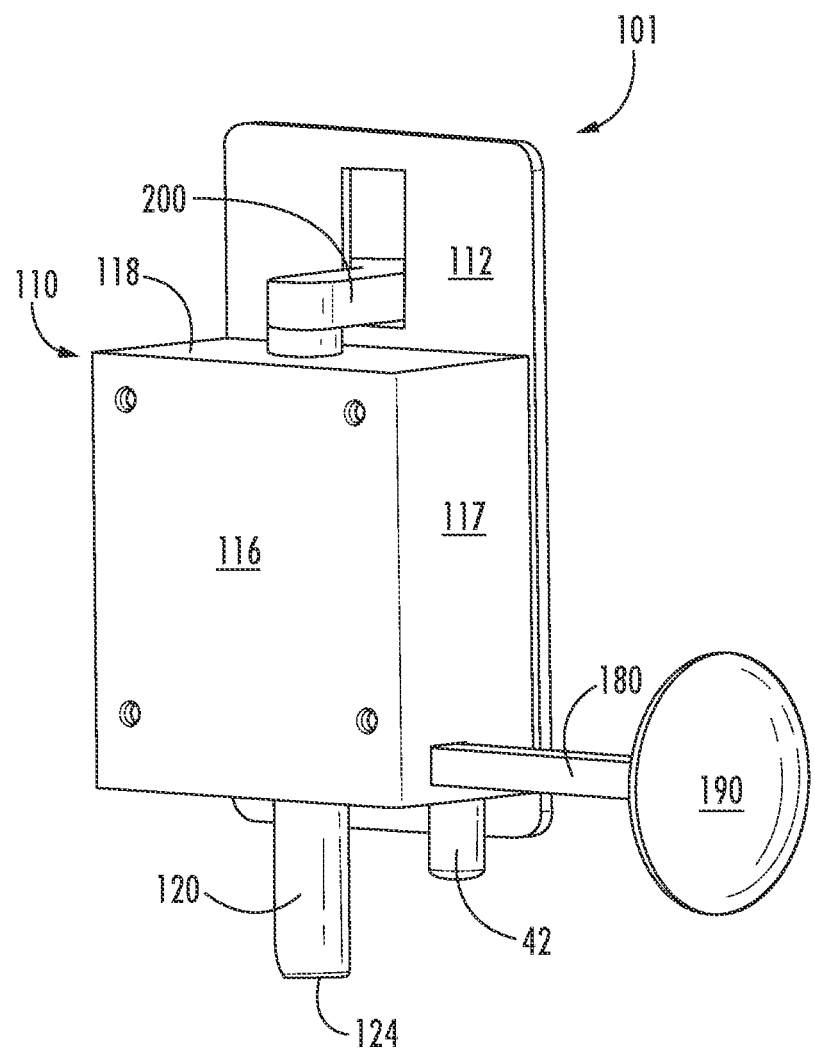
FIG. 12 is a rear isometric view of the latch of FIG. 10.
Figure 13:
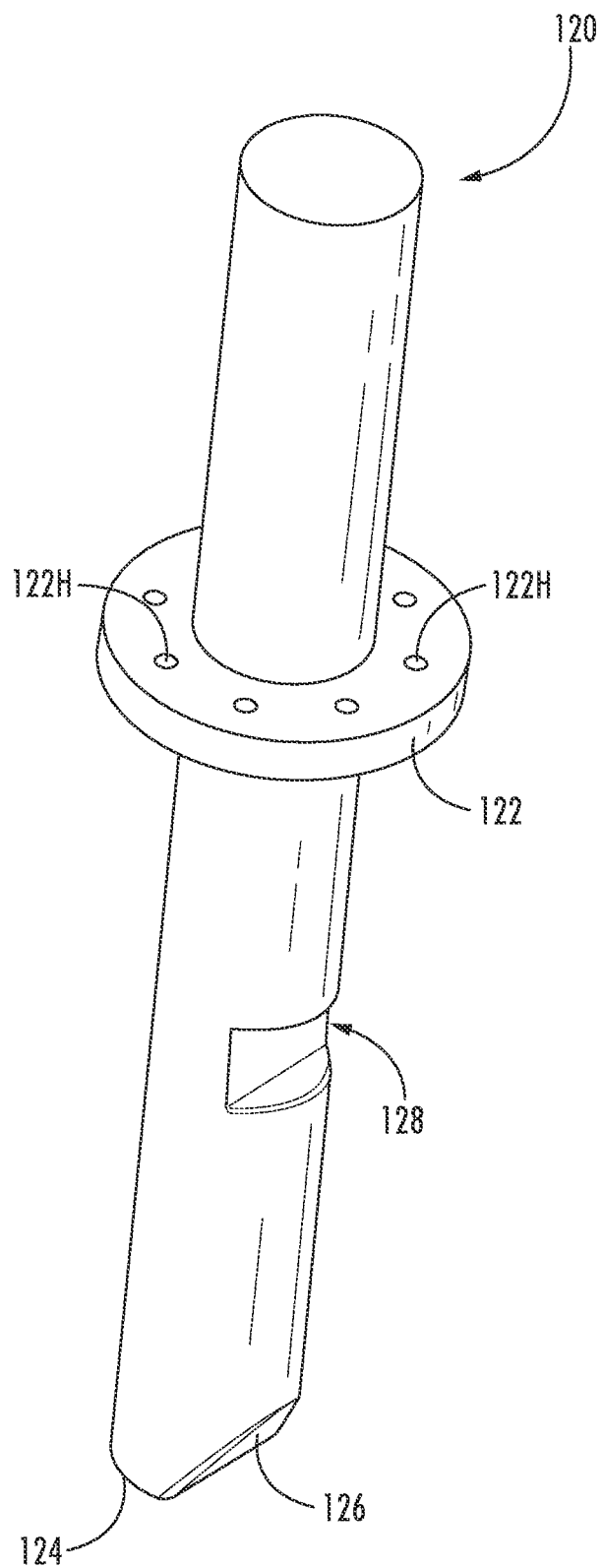
FIG. 13 is an isometric view of a pin suitable for use in any of the latches disclosed herein.

FIGS. 10 through 12 show various aspects of another example embodiment of a purely-mechanical time-delayed latch, generally designated 101. Many of the components of the latch 101 are substantially identical to the components of the latch 100 and like-numbered features or structures are identical, or at least substantially similar, between latches 100, 101, unless described differently herein in relation to latch 101. Each of the latches 100, 101 comprise a cover plate 112, which covers the front side of the housing 110 and prevents access to the components of the latch 100, 101 contained therein. The primary difference between the latch 101 and the latch 100 is the orientation of the release frame 180 and the direction of motion thereof within the housing 110, as well as the positioning of the first elastic member 210 and the notch 128. In the latch 101, each of the release frame 180, the actuator 190, the first elastic member 210, and the notch 128 are rotated, relative to the housing, by about 90° relative to the orientation shown in the latch 100. Thus, using latch 101, the handle 200 may be accessible from one side of a structure on which the latch 101 is installed and the actuator 190 may be accessible from another side (e.g., an opposite side) of the structure. In embodiments in which the latch 101 is installed on a movable barrier, such as a segmented secondary barrier of an aircraft, where the actuator 190 of the latch 100 would protrude into, for example, a walkway or other heavily-trafficked area, the position of the actuator 190 of the latch 101 may be advantageous to prevent unintentional actuations of the actuator 190, since the actuator 190 may be positioned, for example, within a void formed between segments of the segmented secondary barrier.

FIGS. 5 through 9 show an example embodiment of an access control system, generally designated 10, which comprises a door, a time-delay latch, generally designated 100, and a brace arm 40. While the door can have any suitable construction, and can for example be an aircraft door or part of an aircraft door system, in the example embodiment shown in FIGS. 5-9, the door is a segmented, laterally expandable, door, such that the door can be installed to selectively control access through any suitable opening that has a width that is between a minimum and maximum width of the door. Furthermore, such a segmented door can be advantageously utilized in certain space-constrained locations, such as in an aircraft, for being able to have a width when stowed that is narrower (e.g., smaller) than the width when deployed (e.g., secured across an opening for access control). Thus, the segmented door of FIGS. 5-9 comprises a first segment 20 and a second segment 30. The first and second segments 20, 30 have so-called "fingers" that extend towards the opposing segment of the door and are at least partially interleaved with fingers of the opposing segment of the door. Thus, the fingers of the first segment 20 are interleaved, at least partially, with fingers of the second segment 30. As used herein, the term "width" means the distance between the furthest edges of the first and second segments 20, 30, whereas "thickness" is defined as being the shortest distance between opposing edges of the same structure of the door and is generally measured in a direction orthogonal to the width dimension.

Figure 5:
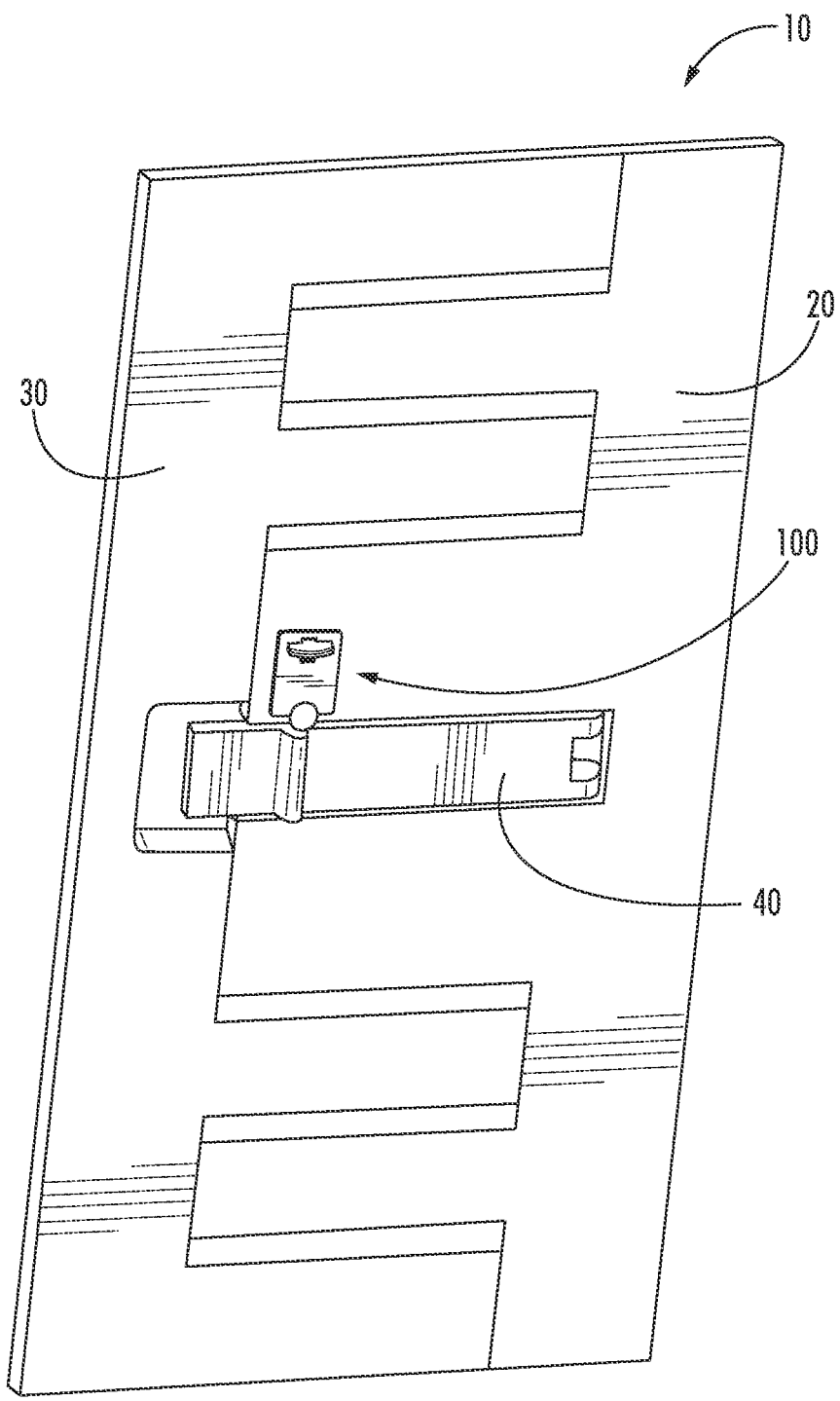
FIG. 5 is an isometric view of a door in which a latch is provided for securing the door in a specified position.
Figure 6:
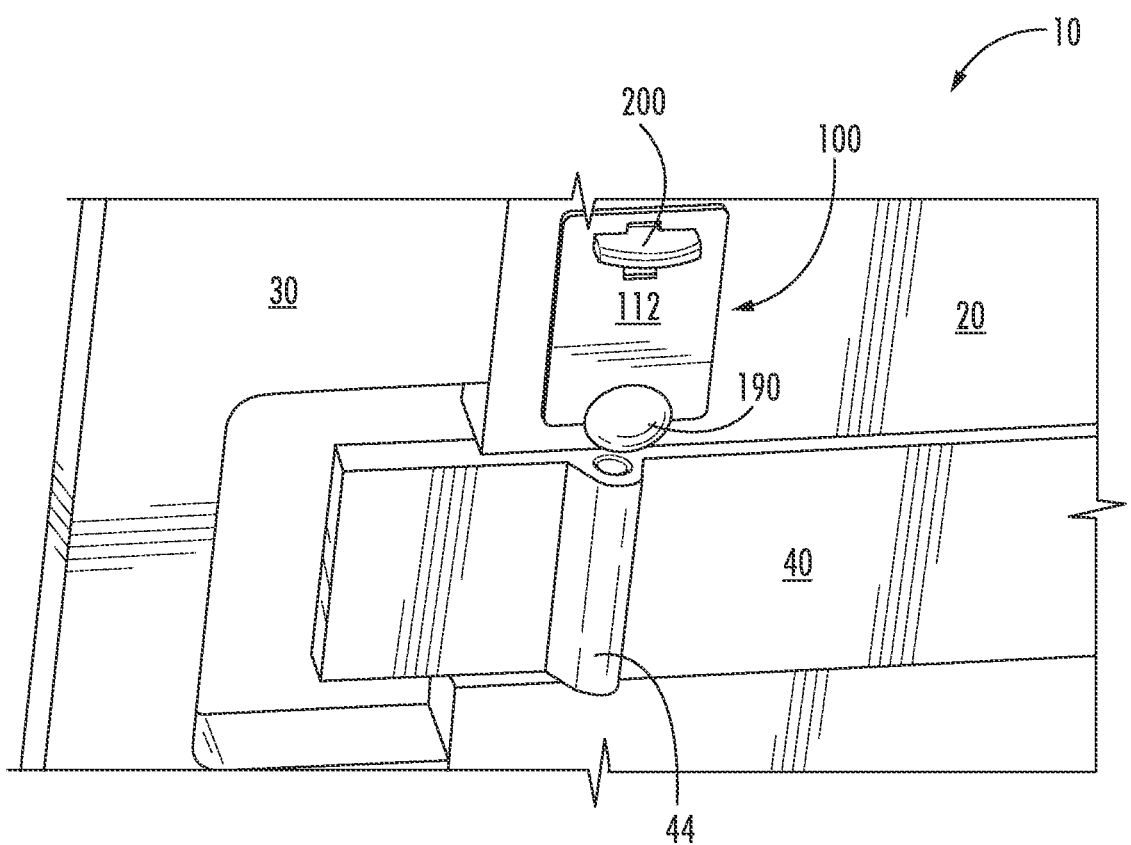
FIG. 6 is an isometric view of a portion of the door and latch shown in FIG. 5, with the latch in an unlatched state.
Figure 7:
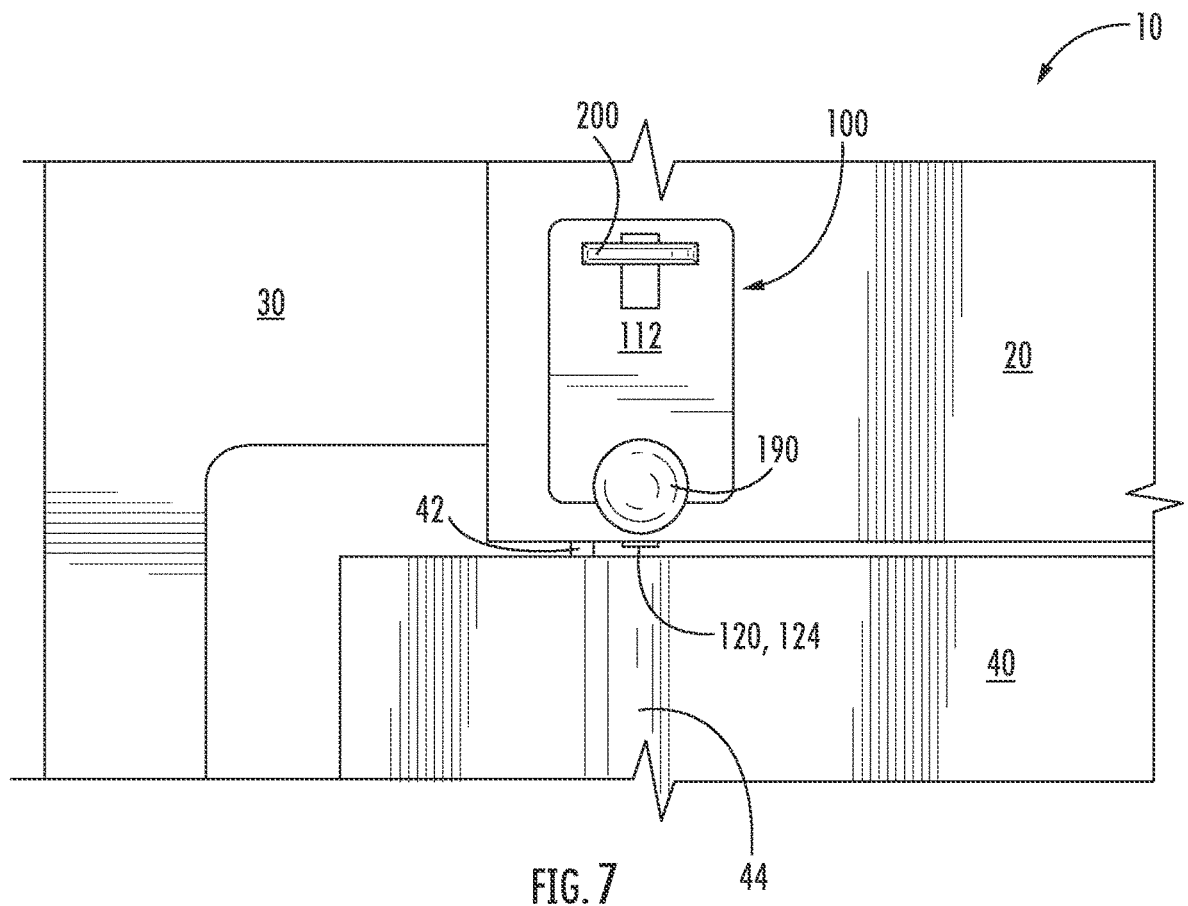
FIG. 7 is a front view of a portion of the door and latch shown in FIG. 5, with the latch in an unlatched state.
Figure 8:
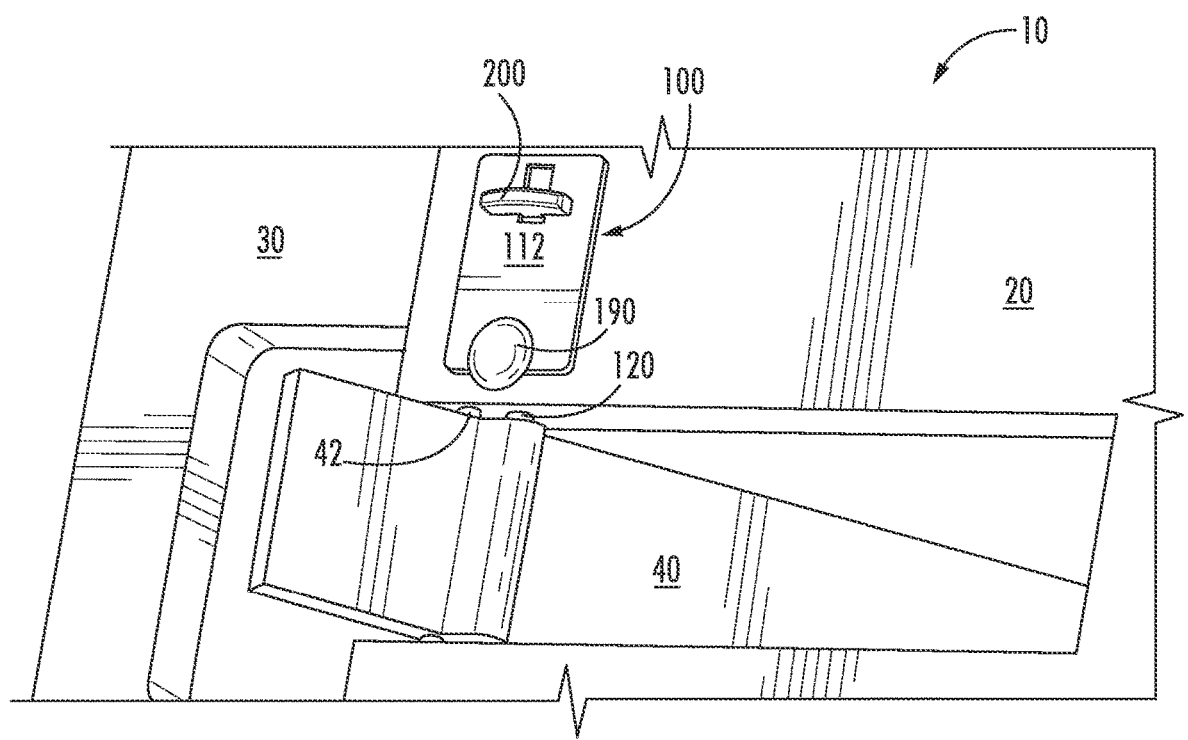
FIG. 8 is a perspective view of the door and latch shown in FIG. 5, with the latch in a latched state, engaged with a brace arm of the door.

The first segment 20 comprises a slot, in which the brace arm 40 is pivotably positioned, and the time-delay latch 100. In FIG. 5, the door is illustrated in the stowed position, in which the outer planar surface of the brace arm 40 is shown to be coplanar with the outer surfaces of the first and second segments 20, 30, respectively. As shown, the door is pivotable along the outer lateral edge (i.e., rightmost edge, as shown in FIG. 5) of the first segment 20. The latch 100 is fixedly attached within a recess formed in the first segment 20. The arrangement of the brace arm 40 and the latch 100 as being attached to the first segment 20 can be reversed from that shown in FIGS. 5-9, such that the latch 100 and the brace arm 40 can be attached to the second segment 30. In some embodiments, the latch 100 and the brace arm 40 can be attached to different segments (e.g., 20, 30) of the door. In order to prevent access to the internal components of the latch 100, the latch 112 comprises a cover plate 112, which substantially occludes (e.g., other than through the slot that defines the movement path of the handle 200) the components of the latch 100 that are contained within the housing 110. Thus, the only components of the latch 100 that are visible external to the first segment 110 are the cover plate 112, which has the handle slot formed therein, the handle 200, the actuator 190, and any portion of the release frame 180 that extends beyond the cover plate 112 to allow for movement of the actuator 190 relative to the cover plate 112. In some embodiments, a decorative element may be provided over and/or within the handle slot to further obscure the contents of the housing 110. Such a decorative element may include, for example, bristles that are displaceable by movement of the handle 200, or a sheet that is affixed to the handle 200, within the housing 110, such that the sheet moves simultaneously with the handle 200 within the handle slot of the cover plate 112.

Figure 9:
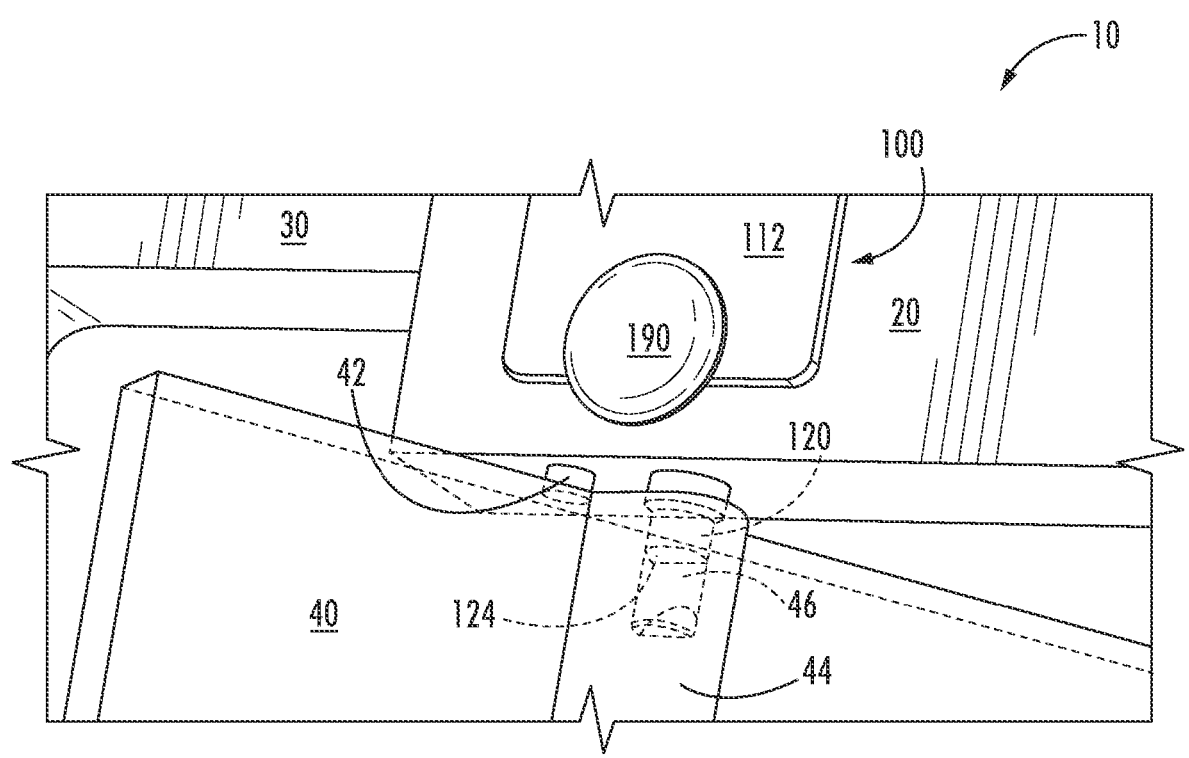
FIG. 9 is a detailed view of the view shown in FIG. 8, in which the connection between the latch and the brace arm of the door.

The brace arm 40 comprises a protrusion 44 with a recessed bore hole 46 formed through at least a portion of the protrusion 44 (e.g., in the direction of the longitudinal axis of the pin 120). The bore hole 46 can have substantially similar (e.g., sufficiently larger to account for tolerances between parts and assemblies and also to ensure robust engagement and proper alignment between the pin 120 and the bore hole 46) outer dimensions as the pin 120, such as at the distal end 124 and the sloped edge 126, as shown in FIG. 9.

The latch 100 comprises a pivot pin 42, which pivotably attached between the brace arm and a portion of the lack 100, for example, the bottom 119 of the housing 110, such that the brace arm is pivotably secured to the first segment 20 of the door via the rigid attachment of the latch 100 to the first segment 20. Thus, when pin 120 is in the unlatched state, the brace arm 40 is capable of pivoting relative to the first segment 20 and, furthermore, the entirety of the door, about the pivot pin 42. When the bore hole 46 of the protrusion 44 is aligned axially with the pin 120 (e.g., the distal end 124 of the pin 120), the handle 200 can be moved from the unlatched position, shown generally in FIGS. 5 through 7, into the latched position, shown in FIG. 8, which directly and simultaneously causes the distal end 124 of the pin 120 to be inserted within the bore hole 46 of the protrusion 44. It is preferred for the protrusion 44 and the brace arm 44 to be shaped such that axial movement of the pin 120 (e.g., in the longitudinal direction of the pin 120) is physically blocked by the structures of the brace arm 124. As used herein, the term "physically blocked" allows for negligible axial movements between the distal end 124 of the pin 120 and the upper surface of the brace arm 40, which is closest to the distal end 124 and is generally positioned in a plane that is parallel to the plane defined by the distal end 124, as shown in FIGS. 5-9. Thus, the pin 120 is only capable of moving into the latched position and, consequently, the latch 100 can only be set in the latched state, when the distal end 124 of the pin 120 is aligned with the bore hole 46 of the brace arm 40 to a sufficient degree to allow insertion of the distal end 124 of the pin 120 into the bore hole 46 by a distance that is sufficient to allow the engagement portion 182 of the release frame 180 to be engaged, by the first elastic element 210, within the notch 128 of the pin 120.

When the distal end 124 of the pin 120 has been inserted within the bore hole 46 of the brace arm 40, the brace arm 40 is locked in position, relative to the latch 100 and the first segment 20, until the pin 120 has been fully disengaged from the bore hole 46 by pushing the actuator 190 to disengage the engagement portion 182 from the notch 128 and, accordingly, to allow the second elastic member 170 to cause the axial movement of the disc 122 of the pin 120 within the fluid chamber 140, in a direction away from the brace arm 40, which takes a prescribed amount of time to elapse, based on the number, geometries, etc. of the orifices 122H and the flow restrictor 130, as well as for the properties of the fluid 160 contained within the fluid chamber 140. Thus, the system 10 can restrict access beyond the door for the prescribed period of time that it takes for the components of the latch 100 to move from the latched to unlatched positions.

While the orientation of the components and the relative motions of the handle 200, the pin 120, and the fluid chamber 140 during actuation of the latch 100 are shown herein in a generally vertical direction, the opposite (vertical) orientation and operation of the components of the latch 100 is also encompassed by the disclosure herein. Additionally, the latch 100 may be, in some embodiments, aligned so that the longitudinal axis of the pin 120 is not aligned vertically (e.g., with gravity, such as when installed on a structure that is oriented on a flat surface of the Earth), but is instead inclined relative to the vertical direction, including installations in which the pin 120 is orthogonal, or perpendicular, to the vertical direction shown in the example embodiments disclosed herein. In some further embodiments, it is also possible for the pin 120 to have a bifurcated, or segmented, longitudinal axis, such that the pin 120 comprises various segments that are joined together, but wherein the segments are not necessarily all coaxially aligned with each other, such that the holes formed in the bottom 142 and the top 144 of the fluid chamber 140 are misaligned (e.g., not coaxial) relative to each other.

It is understood that the example embodiments disclosed herein are not limiting and do not restrict the object disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A time-delay latch for securing a structure in a specified position, the latch comprising:
    a housing;
    a fluid chamber contained within the housing for holding fluid within the fluid chamber;
    a pin that extends through the fluid chamber and is configured for axial movement within and through the fluid chamber; and
    a release frame movably secured within the housing;
    wherein the release frame is configured, when the pin is in a latched position, to engage with the pin to prevent the axial movement of the pin and, when the pin is in an unlatched position, to disengage from the pin to allow the axial movement of the pin;
    wherein the axial movement of the pin between the latched position and the unlatched position requires a prescribed duration of time to elapse; and
    wherein the pin is axially movable from the unlatched position to the latched position faster than the prescribed duration of time.

2. The latch of claim 1, comprising a handle attached to a proximal end of the pin.

3. The latch of claim 2, wherein the pin comprises a distal end, opposite the proximal end, which is extendable axially external to the housing to engage with the structure.

4. The latch of claim 3, wherein the distal end of pin is configured to move from the unlatched position to the latched position, the distal end extending further away from the housing in the latched position than in the unlatched position.

5. The latch of claim 3, wherein an engagement portion of the release frame is configured to engage with a notch formed in the pin when the pin is in the latched position.

6. The latch of claim 5, comprising a first elastic member, which is configured to exert a force against the release frame to press the engagement portion against an outer surface of the pin and into the notch when the notch is aligned with the engagement portion.

7. The latch of claim 5, wherein the release frame is held within a slot of the housing, such that the release frame is movable only in a plane that is perpendicular to a direction of the axial movement of the pin.

8. The latch of claim 6, comprising a second elastic member within the fluid chamber, which is positioned between a disc of the pin and a bottom of the fluid chamber, wherein the second elastic member is configured to exert a force against the disc, which automatically moves the pin from the latched position to the unlatched position when the engagement portion is disengaged from the notch.

9. The latch of claim 8, wherein:
    the fluid chamber comprises a first region and a second region;
    the first region is on an opposite side of the disc from the second region;
    the disc comprises orifices that are formed through a thickness of the disc and are configured such that fluid moves between the first and second regions through the orifices as the pin moves between the latched and unlatched positions;
    the latch is configured such that a volume of the first region decreases and a volume of the second region increases while the pin moves from the latched position to the unlatched position; and
    the latch is configured such that the volume of the first region increases and the volume of the second region decreases while the pin moves from the unlatched position to the latched position.

10. The latch of claim 9, comprising a flow restrictor configured to restrict a flow rate of fluid from the first region into the second region through the orifices as the pin moves from the latched position into the unlatched position, relative to a flow rate of fluid from the second region into the first region through the orifices as the pin moves from the unlatched position into the latched position, such that a force acting on the disc due to the flow of fluid through the orifices is lower when the pin moves from the unlatched position into the latched position than when the pin moves from the latched position into the unlatched position.

11. A method of controlling access to a region of an aircraft, the method comprising:
    providing a barrier that is movable between a closed position, in which access to the region of the aircraft is restricted by the barrier, and an open position, in which access to the region of the aircraft is unrestricted by the barrier;
    providing a time-delay latch for the barrier, the latch comprising:
        a housing;
        a fluid chamber contained within the housing for holding fluid within the fluid chamber;
        a pin that extends through the fluid chamber and is axially movable within and through the fluid chamber from an unlatched position, in which the latch is configured to resist movement of the barrier, to a latched position, in which the barrier is movable without resistance from the latch, and from the latched position to the unlatched position; and
        a release frame movably secured within the housing;

positioning the pin in the latched position, in which the release frame engages with the pin to prevent the axial movement of the pin, relative to the fluid chamber; and moving the release frame to disengage the release frame from the pin, such that the pin automatically moves from the latched position to the unlatched position;

wherein moving the pin between the latched position and the unlatched position requires a prescribed duration of time to elapse, which is more time than is needed to move the pin from the unlatched position into the latched position.

12. The method of claim 11, wherein the latch comprises a handle attached to a proximal end of the pin and the pin comprises a distal end, opposite the proximal end, the method comprising:

extending the distal end of the pin away from the housing in an axial direction to engage with a locking structure of the barrier of the aircraft;

wherein the distal end of the pin is external to the housing.

13. The method of claim 12, wherein the barrier is a door and the locking structure is a brace arm with a bore hole formed and positioned such that the distal end of the pin is insertable within the bore hole when the door is in the closed position.

14. The method of claim 13, wherein the distal pin is only aligned for insertion within the bore hole when the door is in the closed position.

15. The method of claim 12, wherein the release frame comprises an engagement portion that is selectively engageable with a notch formed in the pin when the pin is in the latched position.

16. The method of claim 15, comprising positioning a first elastic member between the housing and the release frame, such that the first elastic member exerts a force against the release frame to press the engagement portion against an outer surface of the pin and into the notch when the notch is aligned with the engagement portion.

17. The method of claim 15, wherein the release frame is held within a slot of the housing, such that the release frame is movable only in a plane that is perpendicular to a direction of the axial movement of the pin.

18. The method of claim 15, comprising:

providing a second elastic member within the fluid chamber, between a disc of the pin and a bottom of the fluid chamber; and exerting, via the second elastic member, a force against the disc to automatically move the pin from the latched position to the unlatched position when the engagement portion is disengaged from the notch.

19. The method of claim 18, wherein:

the fluid chamber comprises a first region and a second region;

the first region is on an opposite side of the disc from the second region; and the disc comprises orifices that are formed through a thickness of the disc;

the method comprising moving the fluid between the first and second regions through the orifices as the pin moves between the latched and unlatched positions;

wherein a volume of the first region decreases and a volume of the second region increases while the pin moves from the latched position to the unlatched position; and wherein the volume of the first region increases and the volume of the second region decreases while the pin moves from the unlatched position to the latched position.

20. The method of claim 19, comprising:

providing a flow restrictor within the first region of the fluid chamber; and using the flow restrictor to restrict a flow rate of the fluid from the first region into the second region through the orifices as the pin moves from the latched position into the unlatched position, relative to a flow rate of the fluid from the second region into the first region through the orifices as the pin moves from the unlatched position into the latched position, such that a force acting on the disc due to the flow of the fluid through the orifices is lower when the pin moves from the unlatched position into the latched position than when the pin moves from the latched position into the unlatched position.

21. An aircraft comprising:

a region of the aircraft to which access must be temporarily restricted;

a barrier that is movable between a closed position, in which access to the region of the aircraft is restricted by the barrier, and an open position, in which access to the region of the aircraft is unrestricted by the barrier; and a time-delay latch for the barrier, the latch comprising:

a housing;

a fluid chamber contained within the housing for holding fluid within the fluid chamber;

a pin that extends through the fluid chamber and is axially movable within and through the fluid chamber from an unlatched position, in which the latch is disengaged from the barrier to allow movement of the barrier, to a latched position, in which the latch is engaged with the barrier to restrict movement of the barrier, and from the latched position to the unlatched position; and a release frame movably secured within the housing;

wherein the release frame is configured, when the pin is in a latched position, to engage with the pin to prevent the axial movement of the pin and, when the pin is in an unlatched position, to disengage from the pin to allow the axial movement of the pin;

wherein the axial movement of the pin between the latched position and the unlatched position requires a prescribed duration of time to elapse; and wherein the latch is configured such that axial movement of the pin between the unlatched position and the latched position occurs faster than the prescribed duration of time.

* * * * *